(12) United States Patent
Smith et al.

(10) Patent No.: US 12,086,108 B2
(45) Date of Patent: *Sep. 10, 2024

(54) SYSTEMS AND METHODS FOR SYNCHRONIZATION EVENT BUILDING AND/OR COLLAPSING BY A SYNCHRONIZATION COMPONENT OF A CLOUD-BASED PLATFORM

(71) Applicant: Box, Inc., Redwood City, CA (US)

(72) Inventors: Benjamin Campbell Smith, Mountain View, CA (US); David Mackenzie, Daly City, CA (US); Yiming Lu, Los Altos, CA (US); Kunal Parmar, San Jose, CA (US); Peter Potrebic, Calistoga, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,804

(22) Filed: Jan. 9, 2023

(65) Prior Publication Data

US 2023/0237023 A1    Jul. 27, 2023

Related U.S. Application Data

(60) Continuation of application No. 17/135,499, filed on Dec. 28, 2020, now Pat. No. 11,550,757, which is a continuation of application No. 15/492,201, filed on Apr. 20, 2017, now Pat. No. 10,877,937, which is a
(Continued)

(51) Int. Cl.
*G06F 16/178* (2019.01)
*G06F 16/182* (2019.01)
*G06F 16/27* (2019.01)

(52) U.S. Cl.
CPC .......... *G06F 16/178* (2019.01); *G06F 16/184* (2019.01); *G06F 16/273* (2019.01)

(58) Field of Classification Search
CPC ..... G06F 16/178; G06F 16/273; G06F 16/184
(Continued)

(56) References Cited

U.S. PATENT DOCUMENTS 6,122,572 A * 9/2000 Yavnai ................. G05D 1/0088
342/16
6,477,545 B1 * 11/2002 LaRue ..................... G06F 16/27
707/625
(Continued)

*Primary Examiner* — Cam Linh T Nguyen
(74) *Attorney, Agent, or Firm* — Sheridan Ross P.C.

(57) ABSTRACT

Techniques for monitoring local and/or remote file systems by a synchronization component (e.g., client/server) of a cloud-based platform are disclosed. In some embodiments, a method of building synchronization events by a synchronization component (e.g., a synchronization server/client) includes obtaining a set of items that have been changed and their new states and retrieving last known states of the set of items that are stored in a reference snapshot inside a filesystem scanner. The method further includes generating differences between the new states and the last known states of the set of items as item changes and utilizing information provided by the item changes to translate the item changes into synchronization events for execution on the opposing file system. A method of handling failed synchronization events by a synchronization component of the cloud-based platform by collapsing a subsequent event with the failed synchronization event is also disclosed.

20 Claims, 16 Drawing Sheets

Related U.S. Application Data division of application No. 14/304,038, filed on Jun. 13, 2014, now Pat. No. 9,633,037.

(60) Provisional application No. 61/834,756, filed on Jun. 13, 2013.

(58) Field of Classification Search
USPC .......................................... 707/634, 610, 611
See application file for complete search history.

(56) References Cited

U.S. PATENT DOCUMENTS

| | | | | |
|---|---|---|---|---|
| 7,509,539 | B1* | 3/2009 | Denefleh | G06F 11/079 |
| | | | | 714/48 |
| 7,634,514 | B2* | 12/2009 | Langan | H04L 67/1095 |
| | | | | 707/999.203 |
| 7,925,625 | B2* | 4/2011 | Mathew | G06Q 10/06375 |
| | | | | 707/610 |
| 8,751,444 | B2* | 6/2014 | Wallace | G06F 16/273 |
| | | | | 707/620 |
| 2001/0048728 | A1* | 12/2001 | Peng | H04L 67/04 |
| | | | | 375/354 |
| 2003/0005161 | A1* | 1/2003 | Chen | G06F 16/27 |
| | | | | 709/248 |
| 2005/0044108 | A1* | 2/2005 | Shah | G06F 16/288 |
| 2009/0083088 | A1* | 3/2009 | Mathew | G06Q 10/00 |
| | | | | 705/1.1 |
| 2012/0166868 | A1* | 6/2012 | Volvovski | G06F 3/064 |
| | | | | 711/170 |
| 2013/0117229 | A1* | 5/2013 | Jain | G06F 13/22 |
| | | | | 707/703 |

* cited by examiner

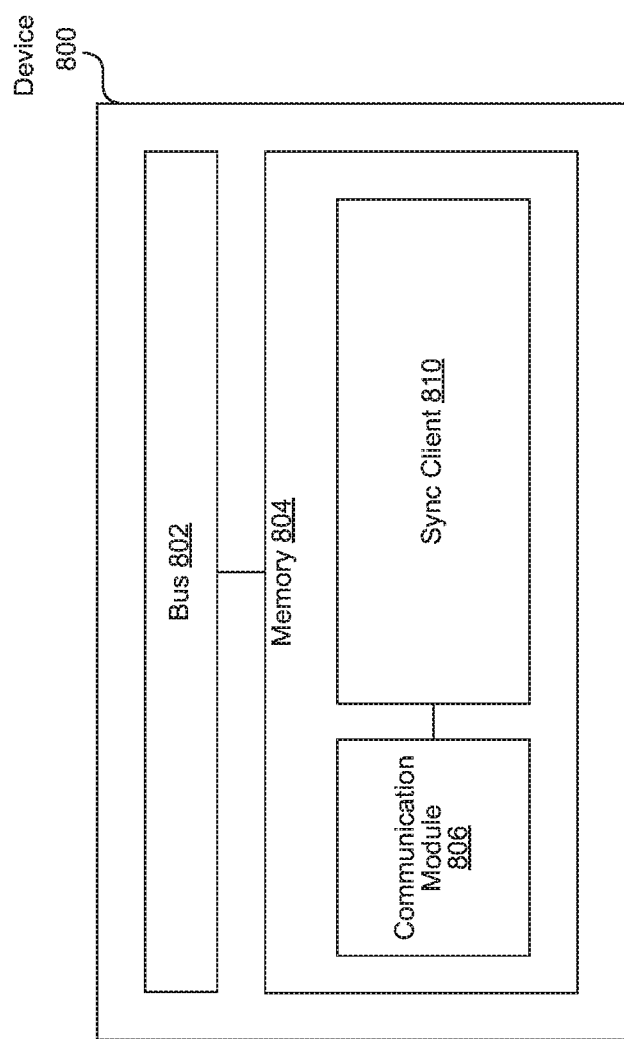

SYSTEMS AND METHODS FOR SYNCHRONIZATION EVENT BUILDING AND/OR COLLAPSING BY A SYNCHRONIZATION COMPONENT OF A CLOUD-BASED PLATFORM

CROSS-REFERENCE TO RELATED APPLICATIONS

This application is a continuation of U.S. patent application Ser. No. 17/135,499, filed on Dec. 28, 2020, which is a continuation of U.S. patent application Ser. No. 15/492,201, filed on Apr. 20, 2017, now U.S. Pat. No. 10,877,937, which is a divisional of U.S. patent application Ser. No. 14/304,038, filed Jun. 13, 2014, now U.S. Pat. No. 9,633,037, entitled "SYSTEMS AND METHODS FOR SYNCHRONIZATION EVENT BUILDING AND/OR COLLAPSING BY A SYNCHRONIZATION COMPONENT OF A CLOUD-BASED PLATFORM", which claims benefit of U.S. Provisional Application Ser. No. 61/834,756, filed Jun. 13, 2013, entitled "SYSTEMS AND METHODS FOR EVENT BUILDING, COLLAPSING, OR MONITORING BY A SYNCHRONIZATION CLIENT OF A CLOUD-BASED PLATFORM", the contents of which are incorporated by reference in their entireties.

BACKGROUND

In a sharing and collaboration environment, multiple users share, access and otherwise perform actions or tasks on content and files in a shared workspace, where any number of users may have access to a given file or may want to or need to perform an action on the file at any given time. Content such as audio/video files, documents or email messages on a user device can be synced with a cloud server and content from the cloud server can be synced with a user device. The syncing occurs when a new content arrives at the server, or when a user makes a request. Syncing can result in new content, updated content and/or deleted content.

BRIEF DESCRIPTION OF THE DRAWINGS

The present embodiments are illustrated by way of example and are not intended to be limited by the figures of the accompanying drawings. In the drawings:

FIG. 8A depicts a block diagram illustrating example components of a device having a synchronization client of the cloud-based platform for synchronization event building using a single mode and/or synchronization event collapsing.

The same reference numbers and any acronyms identify elements or acts with the same or similar structure or functionality throughout the drawings and specification for ease of understanding and convenience.

DETAILED DESCRIPTION

Figure 1:
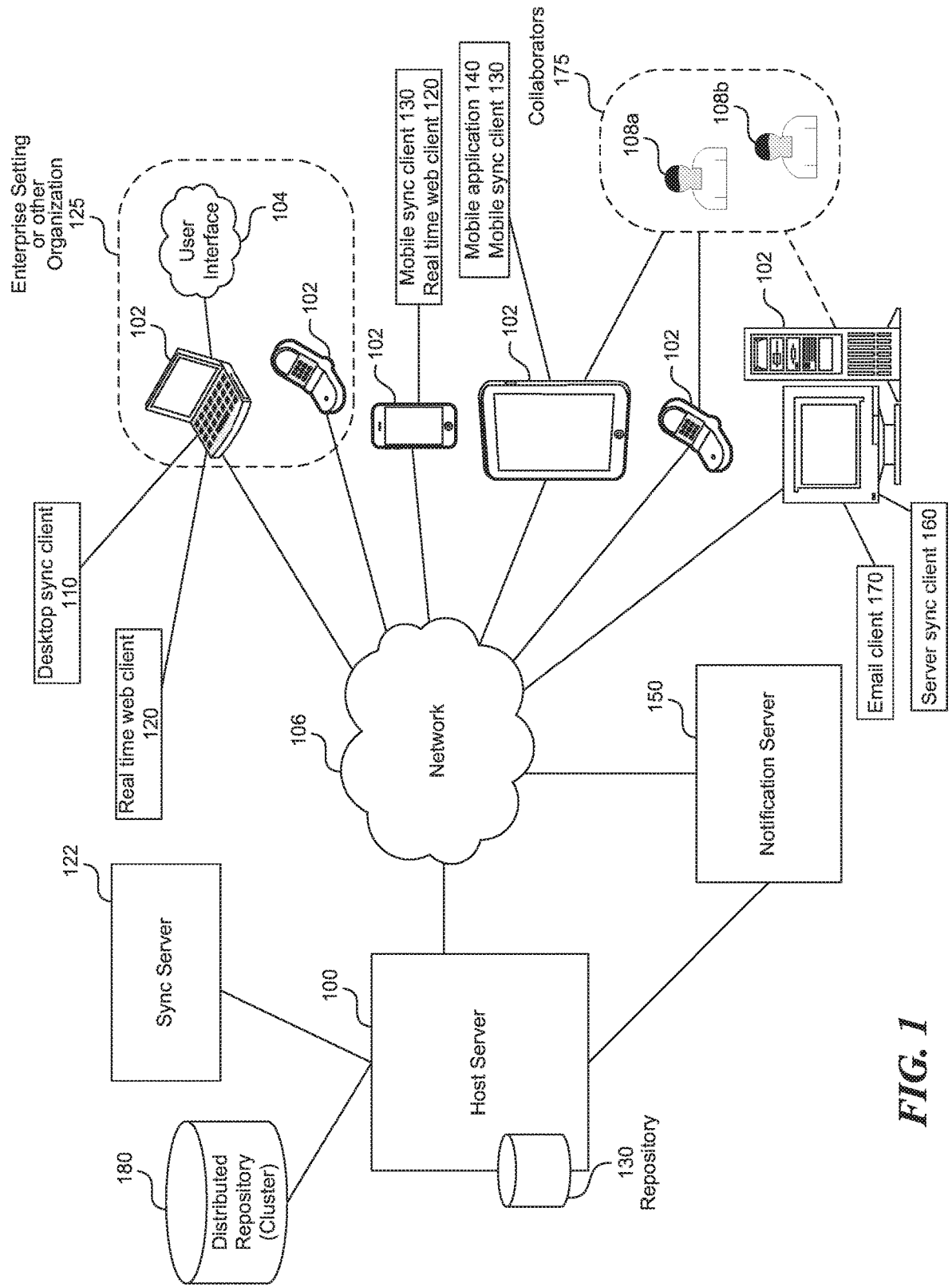
FIG. 1 illustrates an example diagram of an environment suitable for operating a system implementing a synchronization component (e.g., a synchronization client or a server) for synchronization event building and/or collapsing.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

1. Event Building

The present disclosure includes technology for event building by a synchronization client ("sync client") of a cloud-based collaboration and/or storage service ("cloud-based platform").

Local event monitoring by the synchronization client ("sync client"), in some embodiments can be performed in multiple modes. For example, in a full scan mode, the synchronization client examines the entire sync directory and generates differences between what is present in file system and what is in the local database. In the listen mode, a third party library (e.g., 'watchdog') is used to turn file system changed notifications into events.

Events generated by the listen mode and full scan mode have different information, which can break a contract required in event processing that events from both generators are the same and may weaken the system's abstractions. The process of converting a file system change notification to an actual event may require that watchdog perform a full scan of a synchronization directory, making the code less DRY (don't repeat yourself principal) and making bug fixing and optimizations far more complicated. Finally, the logic for switching between the full scan and listen modes can be complicated, error prone, and/or difficult to test.

These challenges can be compounded in some embodiments when local event monitoring is considered alongside the cloud-based platform server event monitoring. For example, the situation of turning a set of differences between trees into a set of events that can be consistently applied has been solved both for the server side and the local side in totally different ways in some embodiments. In addition to algorithmic or process differences, there can also be differences in the data structures used to represent various stages of processing and in the architecture of how events are generated in some embodiments.

The process and architectural differences may not be reflective of true differences between the cloud-based platform (e.g., cloud-based collaboration and/or storage services) server and local storage (of which there are some) and serve to reduce the leveragability of and maintainability of the synchronization codebase.

Various embodiments of the disclosed technology refactors (i.e., applies behavior preserving code transformations that improve source code) event monitoring (event generation and the filter pipeline) systems and methods to address these problems. Some embodiments can maximize code maintainability through encapsulation and reuse. Specifically, various embodiments of the disclosed technology can quickly and incrementally implement critical pieces of the refactoring without delay, while deferring implementation of the less critical pieces for later.

Various embodiments of the disclosed technology can:
1. Remove duplicated full scan logic between the sync client and a watchdog ("watchdog" as used herein refers to the "watchdog" process found in various operating systems (e.g., including MAC operating systems)).
2. Collapse the full scan and listen modes into one mode.
3. Add support for partial scanning of only affected folders.
4. Ensure with high confidence that events are only released into filter pipelines when they are fully consistent and no longer subject to race conditions. In particular, filter pipeline inconsistencies can be considered unrecoverable errors in some embodiments.
5. Provide strongly defined contracts for the information and behavior guarantees on data structures used in the filter pipeline.
6. Move file system access into the initial scanner and out of the filter pipeline in order to strengthen contracts and limit race conditions.
7. Reuse common algorithms and data structures between the cloud-based platform server and the local device.

Example embodiments can be encapsulated so developers can largely defer optimizations for later.

Example Considerations

Event monitoring is the process of turning file system notifications from the file system observers into synchronization events that are suitable for executing on the opposite file system (e.g. remote cloud based storage or local storage). This can be done in some embodiments through a series of transformations on data structures that are outlined here.

File System Notifications

In some embodiments, file system notifications can be generated by file system observers and contain information about the file or folder that changed. In some embodiments, on the cloud-based platform server, action log framework (ALF) events can include information about the new item state and minimal information about the type of change that occurred. On the local side, in some embodiments, notifications can contain only the parent folder of the item that has changed. Accordingly, these notifications may need to be processed in order to be useable.

Item Change

In some embodiments, an item change represents that a specific item changes and can contain the full new state of the item. In some embodiments, on the local filesystem, item changes can be generated by taking a consistent snapshot of the folder whose children have changed and comparing the new snapshot with a reference snapshot. In some embodiments, on the cloud-based platform (e.g., cloud-based collaboration and/or storage services), the item changes can be generated either in a similar manner during full scans or by directly passing through the ALF event. These changes can contain only information about the state of the item and do not convey any information about the order in which the changes must be applied in some embodiments.

Raw Events

Raw events can be generated, in some embodiments, by ordering item changes and producing a set of executable actions that will bring the reference into sync with the new state of the file system. Raw events can be defined relative to the file system identifier of the item. In some embodiments there is no guarantee that produced events will actually be executed.

Sync Events

In some embodiments, synchronization events can be generated by mapping filesystem-specific identifiers to logical identifiers so that the event can be executed directly on the opposite filesystem. In some embodiments, once a sync event is produced, synchronization is committed to either executing the sync event action or marking the item as a problem item.

Item Change Generation

In some embodiments, this component builds item changes with one or more of the following properties:
1. An item change provides all of the information about the new state on the filesystem required for turning the change into a sync event. In other words, no parts of the component will need to access the filesystem once the item change is produced.
2. An item change provides a consistent picture of what actually existed on the file system at some point in time. For example, if there is an item change with new state name 'foo' and parent 'bar', at some point in time, this item really was named 'foo' and at the same time had parent 'bar'
3. The ordering of item changes returned by this component has no meaning. Thus, if a scan of a folder generates a number of changes, there is no guarantee that these changes can be applied in order without generating an inconsistent state (e.g., like two different inodes having the same path at the same time). An inode or an index node is a file structure on a file system that includes all file information except the file contents and the file name). The inode of each file uses a pointer to point to the specific file, directory or object and is typically a unique number.

On both the remote cloud-based platform and the local storage, the process for item change generation in some embodiments, is to obtain a set of dirty items and to then difference the new state of those items against their last known state, which is stored in a reference snapshot inside the filesystem scanner. A dirty item is generally an item (e.g., file, folder, directory, etc.) that has been written to or modified and the modifications are yet to be written to the underlying file system. In some embodiments, on the remote file system, the list of dirty items can be obtained by listening to the ALF stream, which either directly provides dirty items and their new states or provides notifications that specific folders are recursively dirty, requiring a scan of the affected folder to obtain the resulting dirty items. On the local system in some embodiments, the filesystem observer may only provide notifications about dirty folders. Accordingly, the local system may have to perform a partial scan in order to determine the full set of dirty items. On startup, both sides can be initialized with an event marking the root folder as recursively dirty in some embodiments.

In some embodiments, partial scanning is achieved through the following method at least in part:
1. Generate a consistent snapshot
   a. On the cloud-based platform, this can be achieved through the folders endpoint with transactional GAT (get account tree).
   b. On the local storage or device, a snapshot can be built by walking or traversing the directory and recording all entries. If there are no dirty folders added to the queue for a certain period of time (e.g., ~100 ms), the snapshot can be called consistent. If there is a new file system notification, a snapshot can be built for that notification, and a new snapshot is built by merging the snapshot for the dirty folder on top of the original snapshot.
2. Generate differences between the reference snapshot and the current snapshot
   a. Generate a list of all item ids that are in the reference snapshot and in the domain of the current snapshot
   b. Loop through all elements in the current snapshot, and yield item changes for everything that has a different item state in the reference snapshot. Further, remove all observed items from the all item id list.
   c. Yield item changes with delete set to true for all items remaining in the all item id list.
3. Update the reference snapshot by applying the new snapshot on top of it. Note that for the first run, the reference snapshot can be built from the persisted Last Sync Item Store (LSIS) in some embodiments.

In some embodiments, item changes can be fed by the monitor into the filter pipeline using the same rules about flushing buffers as before. In some embodiments, however, there are no state transitions in the monitor, as there is no difference between full scan and listening mode.

In some embodiments the reference snapshot used for determining which items have changed during the partial scan must reflect not only the changes detected during the last partial scan but also any changes made by the sync executors on the monitored file system. This may be necessary in some embodiments because it is possible for the changes performed by the sync executors to be undone by other operations on the monitored filesystem before they can be detected by a scan. For example, a newly created item can be immediately deleted or a newly renamed item can be immediately renamed back to its original name. If the reference snapshot is not aware of the change made by the sync executors, it will not know to generate an item change for these items since nothing has changed about the item since the last scan. As a result, the file systems will fall out of sync. Another benefit of pushing the most up to date information about the monitored filesystem into the scanners is that it gives a completely state based means of handling echoback events. Because the scanner already has the information about the changes made to the monitored filesystem by the sync executors, it will not pick up those changes during its next partial scan.

An example pseudo code for building a reference snapshot for the file system and on a new notification, generating item changes using a diffing algorithm. In some embodiments, the algorithm for the cloud-based platform uses ALF instead of file system observers and has no requirement for a settle time.

```
class LocalFSScanner:
    def on_start( ):
        # Launch the observer that will feed dirty folders into the queue.
        self._launch_fs_observer( )
    def get_next_item_change( ):
        while not should_stop:
            dirty_dir, recursive = self._dirty_dir_queue.get( )
            consistent_snapshot = None
            while dirty_dir:
                consistent_snapshot = FSSnapshot(list_dir,
item_state_callback, dirty_dir, recursive)
                dirty_dir, recursive = self._dirty_dir_queue.get(0.1) #
100 ms
            difference = FSSnapshotDiffer(self._reference,
consistent_snapshot)
            for item_change in difference.events( ):
                yield item_change
            # Update the reference - this is built to begin with from LSIS
in init
            self._reference = consistent_snapshot
```

An example pseudo code for building a snapshot of the file system at a point in time is provided below. Whether or not the snapshot is consistent can be left to the caller to deal with in some embodiments.

```
class FSSnapshot:
    # list_dir_callback -> map a path to a list of path, item_state for children
    # Note that it needs the parent id to build the
    item_state
    # item_state_callback -> map a path to an item_state
    # path -> the path to start with
    # recursive -> whether to recurse or not
    def __init__(list_dir_callback, item_state_callback, path, recursive):
        self._update_for_path('', True)
    def _update_for_path(path, recursive, item_id=None):
        item_id = item_id or self._item_state_callback(path).item_id
        for item_path, item_state in self._list_dir_callback(path, item_id):
            # Record the entry (e.g., in a dictionary)
            self._record_item_state_for_item_id(item_state,
item_state.item_id)
            # Recurse
            if recursive and item_state.item_type == ItemType.FOLDER:
                self._update_for_path(item_path, True,
item_state.item-_id)
    # Public accessors:
    def item_states( ) # return all item states in the dictionary
    def item_state_for_item_id(item_id) # return the item state for the item_id
    def contains_item_id(item_id) # returns whether there's an entry for
item_id or not
```

An example pseudo code for building item change events from a pair of snapshots is provided below.

```
class FSSnapshotDiffer:
    def events( ):
        # Build a set of all the item ids in the reference snapshot
        all_reference_item_ids = set([item_state.item_id for item_state in
self._ref_snapshot.item_states( )])
        # Loop through all the item ids in the new snapshot and check for
changes
        for new_item_state in self._new_snapshot.item_states( ):
            # Remove it from the list of all item ids. Be careful as you
may see an item_id more than once due to hard links
            if new_item_state.item_id in all_reference_item_ids:
                all_reference_item_ids.remove(new_item_state.item_id)
            if
self._ref_snapshot.contains_item_id(new_item_state.item_id):
                # If the reference contains this item id, we need to
check
                # if there have been any changes to the item
                ref_item_state =
self._ref_snapshot.item_state_for_item_id(new_item_id)
                # If the item states differ, return an item change
                if ref_item_state != new_item_state:
                    yield ItemChange(new_item_state)
            else:
                # if the reference does not contain it, then it's a
create
                yield ItemChange(new_item_state)
        # Lastly, process all the deletes (the items that are not in the new
snapshot)
        for item_id in all_reference_item_ids:
            ref_item_state =
self._ref_snapshot.item_state_for_item_id(item_id)
            yield
ItemChange(ref_item_state.copy_with_changes(is_deleted=True))
```

Item Change Ordering

In some embodiments, the item changes emitted by the filesystem scanners will occur in order per item but will not have a well-defined inter-item ordering. In some embodiments, it is the responsibility of the item change re-orderer to detect inter-item event dependencies and re-order the changes as necessary. It can do this by checking each change against a snapshot of the monitored filesystem to see if the new state brought about by the change is consistent with the rest of the filesystem. If it is, the change can be passed on to the rest of the filter pipeline and the snapshot can be updated to reflect the change. Otherwise, the change can be buffered until another item change alters the snapshot in such a way as to make the buffered change consistent. In some embodiments, if an item change remains buffered for longer than a filesystem specific timeout, then it is assumed that either a change has been missed by the filesystem scanner or the filesystem scanner has returned corrupt changes, and in either case, an assertion is raised and the application is taken down.

For each change, the re-orderer can perform the following checks in some embodiments to determine if the change is consistent with the existing snapshot:

1. If the change is for a deleted folder, the snapshot is checked to see that the folder does not contain any children.

2. If the change is for a non-deleted item, the snapshot is checked to see that the parent folder of the item exists and that no other item with the same name exists in the parent folder.
3. If the change represents a move, the snapshot is checked to see that the item is not an ancestor of its new parent.

In addition to performing these checks, in some embodiments, the re-orderer can also be capable of detecting and handling circular renames by manufacturing an item change for one of the items that moves the item to a temporary location.

Like the filesystem snapshot used in the scanner for generating raw events, the filesystem snapshot used when re-ordering the raw events can reflect both the changes made by raw events emitted from the generator as well as the changes made by the sync executors on the monitored filesystem in some embodiments. This can be performed because the re-orderer will now no longer receive information about echoback events from the scanner and so it needs to get that information directly from the executor in order to have a full picture of the monitored filesystem.

Raw Event Generation

Following the item change ordering, raw events can be produced by diffing the new item state in the item change against the old state in the re-orderer's snapshot (i.e., comparing the new item state with the old state to determine how and whether the two items differ). This can include detecting when an item has transitioned from syncable to unsyncable or vice versa and generating create and delete events as appropriate. The raw events produced can have the following properties in some embodiments:
1. They describe executable actions like create, delete, etc. However, no guarantees are made as to whether or not the business logic dictates that they should be executed.
2. Raw events are produced in an order that can be consistently applied to a frozen file system without generating any inconsistencies. This means that the actions represented by a raw event can only fail during actual execution (because of changes to the file system) and not during processing. In particular, a filter pipeline inconsistency is considered an unrecoverable error.
3. Raw events refer to the file system id, rather than the logical id. On the cloud-based platform, these two are the same, but on local, there is a difference between inode and the logical id.

Sync Event Building

In some embodiments, raw events can then be processed into sync events suitable for execution. On the cloud-based platform, this can be a straight translation in some embodiments since the filesystem id on the cloud-based platform can be suitable for use as a logical id for the item. On the local storage system or the local device, the filesystem id can change while the item remains logically the same and so the atomic save filter can be necessary in order to maintain the mapping between logical ids and their underlying filesystem ids. No other filters may be required on the local storage system to do this conversion in some embodiments. Sync events can have the following properties in some embodiments:
1. They describe executable actions like create, delete, etc., that sync is committed to at least attempting to execute.

2. They are produced in an order that can be consistently applied to a frozen file system, and should only be validated by actually executing their action on the appropriate filesystem.
3. They refer to logical ids rather than file system ids.

Event Collapsing

The present disclosure also includes technology for event collapsing by a sync client and/or a sync server of a cloud-based platform.

In some embodiments, event collapsing can be part of how the Sync Event Queue handles the failed events that are not intermittent (e.g. the create event which failed due to a name conflict on the opposite file system). For those kinds of failures, simply repeating the same event does not solve the problem in some embodiments. Instead, it relies on some later event (either from the user or from the sync client) to succeed. For example, "Create A" which fails due to name conflict has to be collapsed with "Rename A to A-copy" (which is generated by Conflict Recovery Manager) before Sync Event Queue retries this event.

Embodiments of the sync event collapsing system can include the following features in some embodiments:
1. Make the name conflicts recovery behave correctly.
2. Make the failure recovery behave correctly.

In some embodiments this may require that the system should only do the collapsing if it is necessary. For example, the system should not collapse two edit events.

Examples of Collapsing Rules

In some embodiments, recovery of the following example failure scenarios may need collapsing:
1. Name conflicts: For all the events that failed because of the name conflicts on the opposite file system, use a rename event after the original event when retrying the failed event. For those events, collapse to the original one.
   a. Create(x), Rename(x, y)→Create(y) (Collapse to original);
   b. Rename(x, y), Rename(x, z)→Rename(x, z) (Collapse to original);
   c. Move(q.x, r.x), Rename(r.x, r.y)→Move(q.x, r.y) (Collapse to original);
2. Item does not exist on the source filesystem during execution: For these events, sync client usually has a delete event after the failed event when we retry the failed event.
   a. Create(x), Delete(x)→NoOp (Discard both);
   b. Rename(x), Delete(x)→Delete(x) (Discard original);
   c. Edit(x), Delete(x)→Delete(x) (Discard original);
   d. Move(q.x, r.x), Delete(r.x)→Delete(x) (Discard original);
3. Item has been changed when delete the item on the opposite file system: For those, events, use a create event to restore the deleted item on the source file system.
   a. Delete(x), Create(x)→NoOp (Discard both);

An example pseudo code for collapsing sync events is provided below.

```
def _try_collapsing_sync_event(self, original_sync_event):
    #Go through the later events associated with the same sync item until a successful collapse
    sync_events - _item_id_to_sync_events get_list
    (original_sync_event
    item_id)
```

```
for sync_event in copy.copy (sync_events):
    if sync_event.event_state != SyncEventState IN_PROCESS and
original_sync_event.seq_no <sync_event. sef_no:
        if successfully collapse original_sync_event and sync_event:
            break
```

2. Local Event Monitoring Refactor

The present disclosure also includes technology for local event monitoring refactor by a sync client of a cloud-based platform.

The local event monitoring can be either in, for example, the listening or full scan mode in some embodiments. In the listening mode, the system receives events for items that are changing on the filesystem. On Mac OS-based clients, the OS can notify the sync client about directories that have changes. The sync client can re-scan the directories to manufacture or generate the events. On Windows OS-based clients, for example, the OS gives the sync clients the actual or real events except for moves and renames which are reported as delete+create events.

In the full scan mode, the system can compare the state of the filesystem with the Last Sync Item Store (LSIS) to manufacture or generate events for the changes that have occurred. The raw events that are generated by the listener/full scanner can be fed into a filter pipeline that normalizes the stream of raw events and produces sync events that then the rest of the system can apply on the other filesystem in some embodiments. Because of the difference in the way the events are generated on each platform (for example the delete+create for moves), the filter pipeline configuration can vary based on the platform.

With the above described state, there are two implementations of full scan and both operate with different sets of data. Each implementation can manufacture a different set of events, bug duplication, code duplication, etc. The events can also be different across different platforms. This can have cascading effects—e.g. the filter pipeline may be different. The event generator on a MAC platform has the filesystem information but on Windows platform it does not and so it may be necessary to have one filter to collect the filesystem information and add it to the raw events (which can introduces race condition because the item may have changed). Accordingly, some embodiments refactor the Local Event Monitor so that the system only has one full scanner implementation. Some embodiments always use full scan mode for all platforms.

In the listening mode, example embodiments use a third party library called Watchdog. Some embodiments merge the two full scanner implementations with the system in one of two ways—
1. remove the existing full scanner and use the Watchdog, or
2. remove the Watchdog and implement the system's own full scanner.

FIG. 1 illustrates an example diagram of an environment suitable for operating a system implementing any of the disclosed technologies. As shown in FIG. 1, a host server 100 of a cloud-based service, collaboration and/or cloud storage platform ("cloud-based platform") can incrementally update remote sync clients (e.g., clients 110, 120, 130, 140, 160, 170) at devices 102 with events that occurred via the platform hosted by the server 100. Similarly, the devices 102 can update a sync server 122 and/or the host server 100 of the cloud-based platform with events that occurred locally on the devices via the sync clients (e.g., clients 110, 120, 130, 140, 160, 170) on the devices.

The client devices 102 can be any system and/or device, and/or any combination of devices/systems that is able to establish a communication or a connection, including wired, wireless, cellular connections with another device, a server and/or other systems such as host server 100, the sync server 122 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, biogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, !MT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
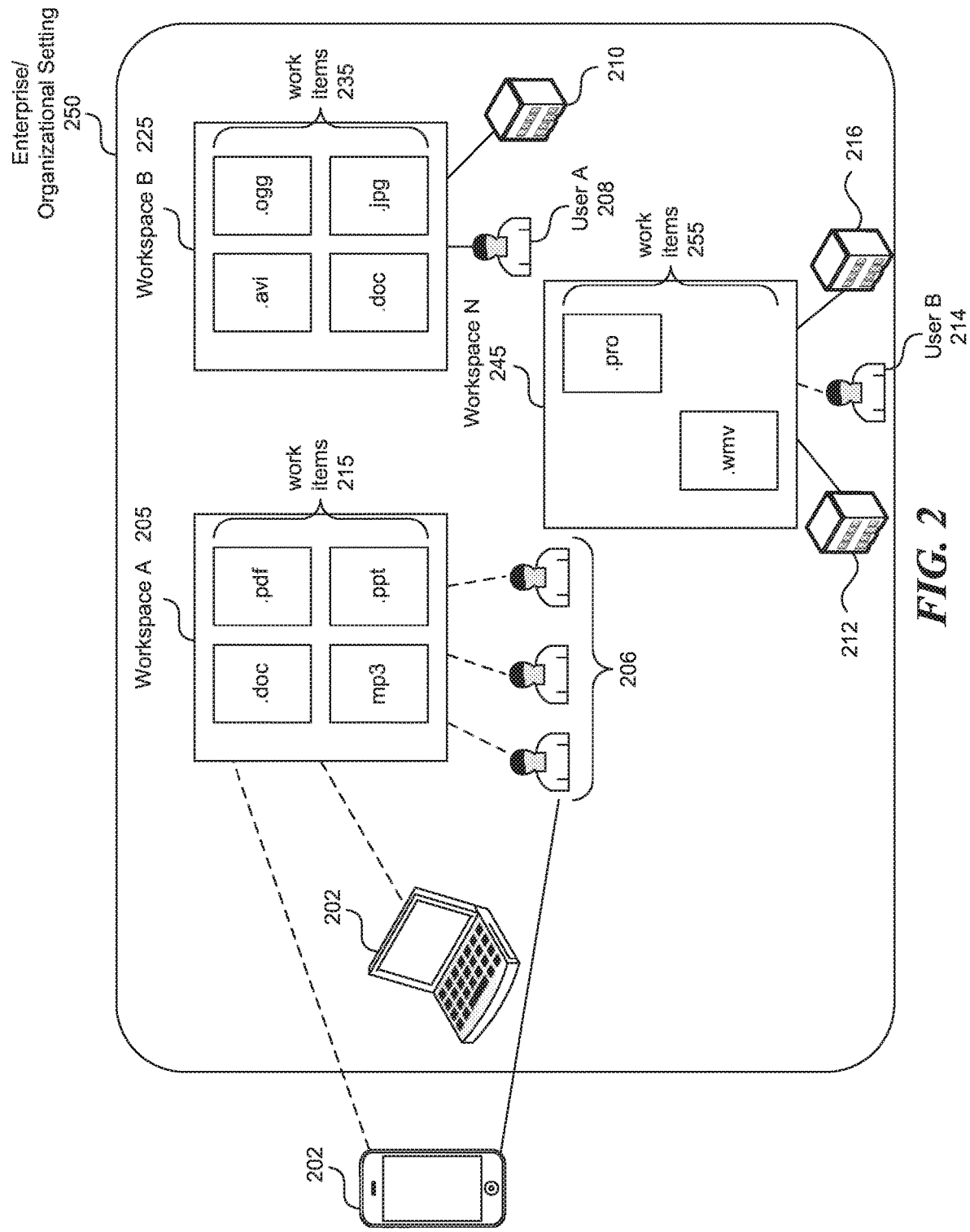
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

Embodiments of the present disclosure provide event building, collapsing, or monitoring by a synchronization component (e.g., sync client or a sync server) of a cloud-based platform hosted by the host server 100.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

In general, when a user action takes place, the user action is processed (e.g., as described in FIGS. 4A-4B below) to become a plurality of event entries each corresponding to a collaborator 175, and each event entry can be read by a remote client of the collaborator to reflect the user action.

Various embodiments of the synchronization client (e.g., client 110) can ensure the correctness of the synchronized tree and other synchronized items (e.g., folders or files) completely independent from the order in which the client receives events from the action log framework ("ALF") system. In other words, so long as the ALF system correctly delivers all events to the synchronization client, the synchronization client can end up in the correct final state.

More implementation details regarding the synchronization clients 110-170, the host server 100, the repository 130, distributed data cluster 180, and various techniques in implementing event building, collapsing and monitoring by a sync client and/or a sync server are discussed below.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
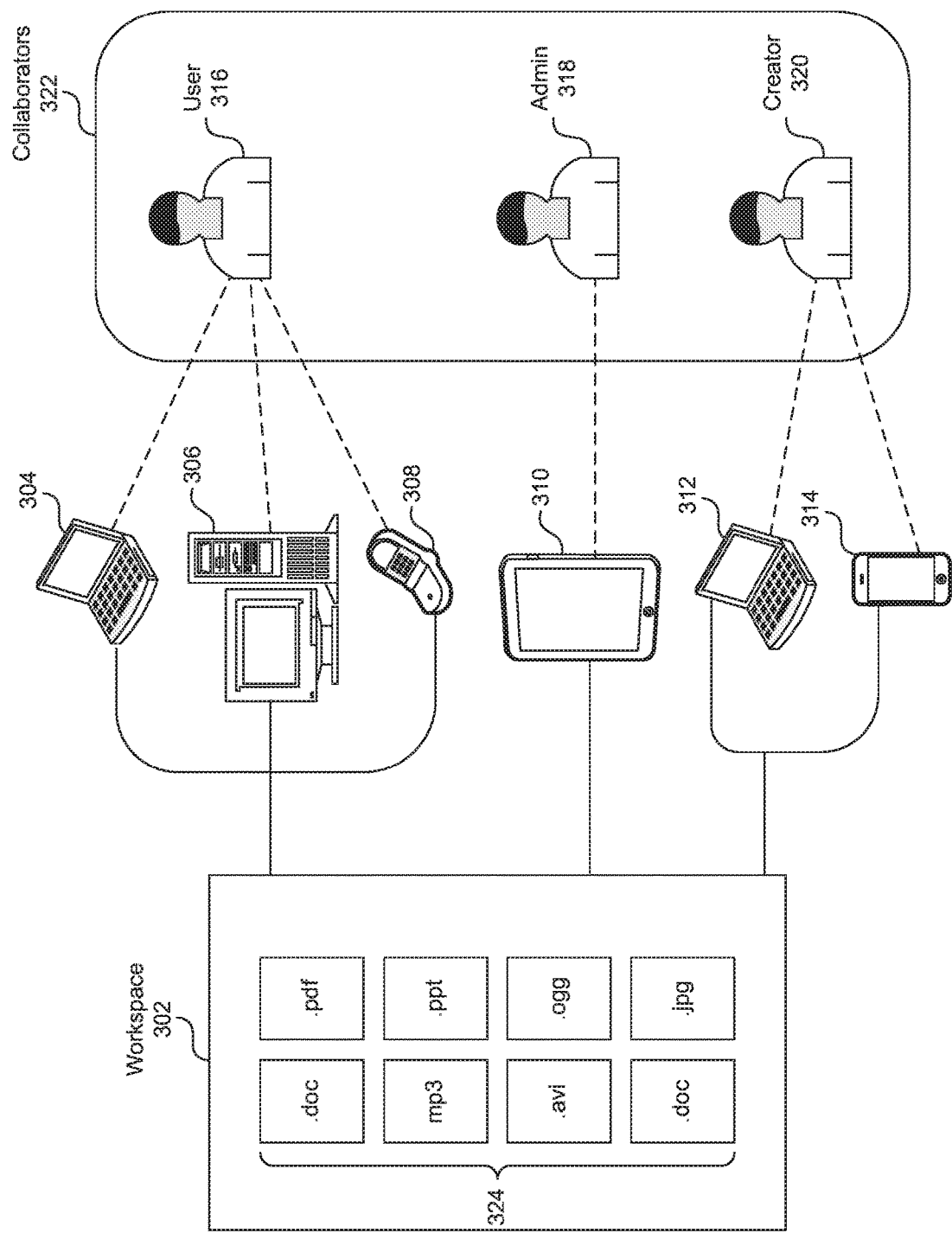
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
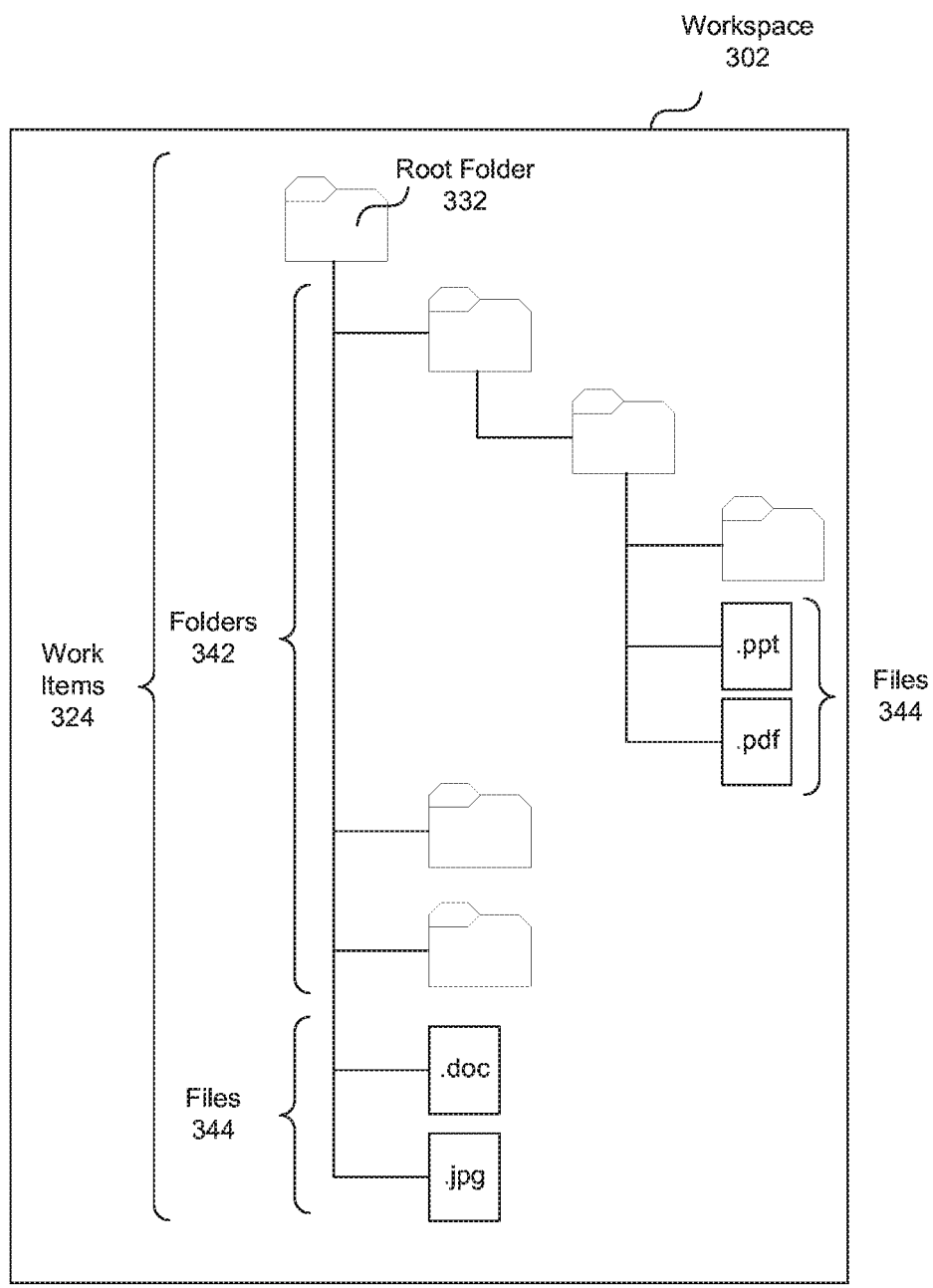
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Further, in some of the present embodiments, the synchronization state of a folder can be: (i) synchronized, (ii) partially synchronized, or (iii) unsynchronized. For purposes of discussion herein, a folder is synchronized when all items (e.g., folders and files) under the folder are synchronized. Likewise, a folder is unsynchronized when all items (e.g., folders and files) under the folder are unsynchronized. A folder is partially synchronized when it is neither synchronized nor unsynchronized.

Figure 4A:
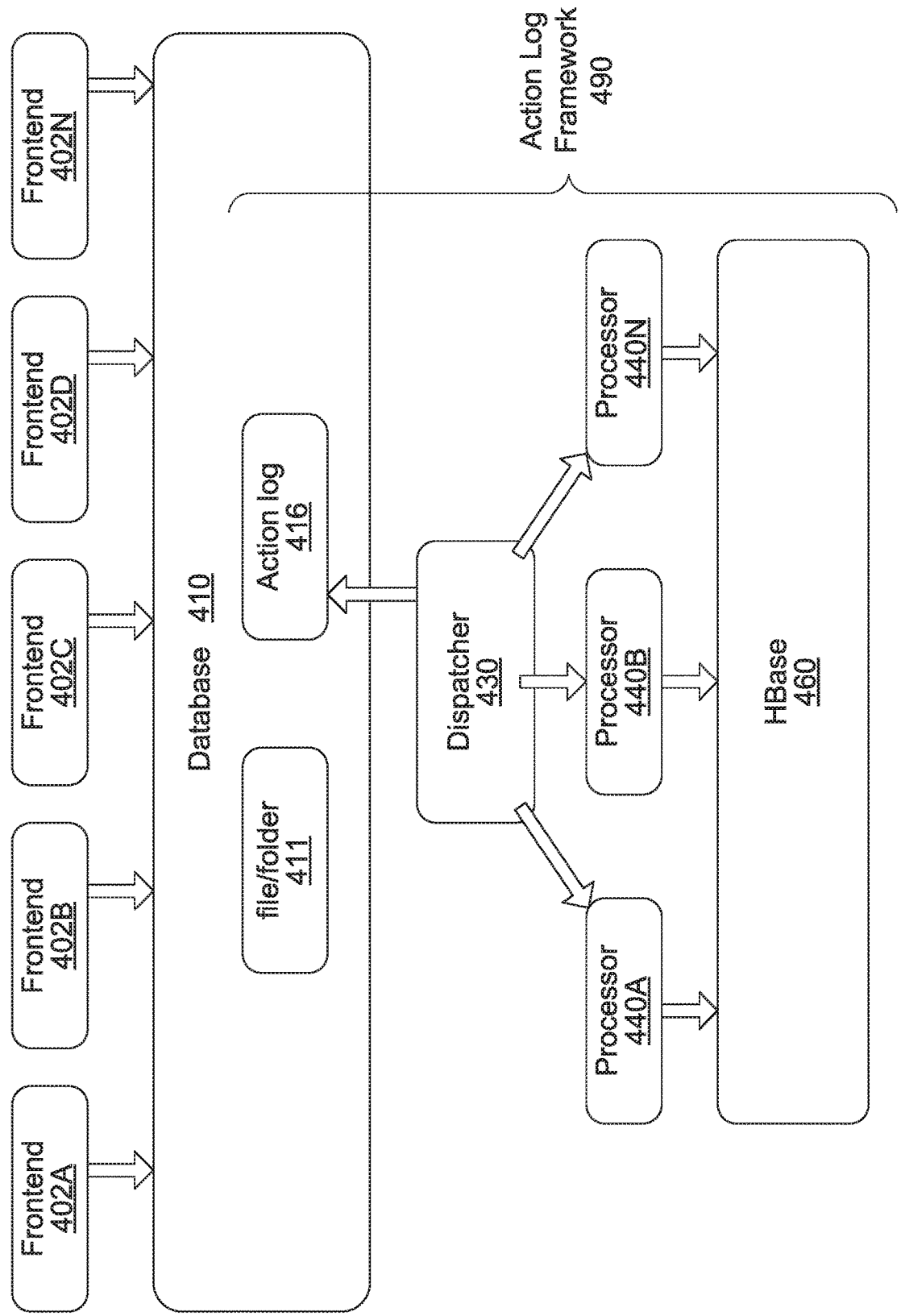
FIG. 4A depicts an example system block diagram showing the interaction between server-side components for incrementally updating a remote client with events or actions that occurred via a cloud-based platform.

FIG. 4A depicts an example system block diagram showing the interaction between server-side components for incrementally updating a remote client with events or actions that occurred via a cloud-based platform.

The server-side includes front end components 402A-N, a database 410, a dispatcher 430, one or more processors 440A-N, and a second database (e.g., HBase 460). The front end components 402A-N can interface with client devices/end user devices to detect/identify actions or transactions or events. The data or file change that occur as a result of the event is effectuated in the database 410 of the cloud-based platform (e.g., the relevant changes are made in the file table 411 of the database).

Depending on the type of action or event, an action log entry can be created and stored in the action log table or action log 416. In general, the front end 402 determines whether an action log entry is created from a given action or transaction. In general, an action log entry can be created for an action or event if certain durability requirements are to be met. The dispatcher 430 reads the action log entries from the action log 416 and sends them to the processors 440A-N where the fan-out, or collaborators to be notified of the event or to receive the file/data change as a result of the event is determined. Based on the computed fan-out or identified collaborators, the processors 440A-N writes the events/transactions to the relevant queues in the second database 460, from which remote clients can read.

It is noted also that the action log 416, the dispatcher 430, the processors 440A-N, the HBase 460, and one or more real time clients 470A-N (see FIG. 4B) are generally referred to as an "action log framework (ALF) 490." More specifically, HBase 460 is a primary data repository of the ALF 490. User actions initiated (e.g., via the web application or the API) result in rows (or action log entries) being written to the action log 416 (or action log table 416). Then, in some embodiments, the action log entries are read from action log 416 by the ALF dispatcher 430, de-normalized into separate entries per user that needs to be notified of the action by an ALF processor (e.g., processor 440A), and written to the HBase 460. The HBase 460 is in turn read (e.g., via an API web service call) by real time clients 470A-N to notify a collaborator of the new change.

Figure 4B:
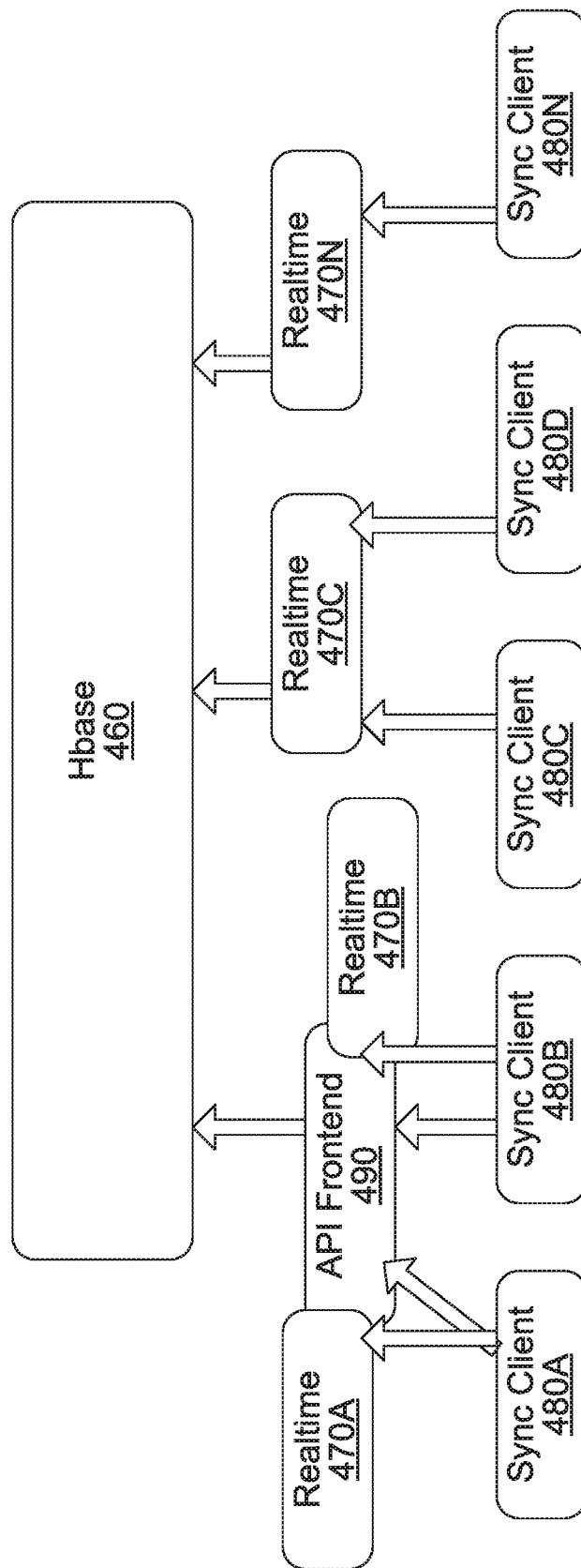
FIG. 4B depicts an example block diagram showing the interaction of remote clients and with a distributed database cluster for incremental updates of events/actions which occurred at a cloud-based environment.

FIG. 4B depicts an example block diagram showing the interaction of remote clients 470A-N and 480A-N with a distributed database cluster 460 for incremental updates of events/actions which occurred at a cloud-based environment. The remote clients can include, for example real time clients 470A-N (e.g., real-time web clients launched via a web browser, mobile application), and synchronization clients 480A-N (e.g., desktop synchronization, mobile synchronization, server synchronization, etc.) that users or collaborators use to interface/access the cloud-based platform including, but not limited to, a collaboration environment. Other types of clients may also read from the database cluster 460.

The queues in the database 460 (e.g., the distributed database cluster) are usually client type specific. For example, each queue is for a given client type for one given user. So, a user 'A' may have a synchronization client queue that all of the synchronization clients that user "A" uses reads from since user "A" may have multiple devices on which synchronization clients are installed. In general, the queues for clients in the database 460 are read only queues such that multiple clients can read from the same queue without making modifications. In this manner, if a user utilizes multiple synchronization clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, synchronization clients 480 connect to both real-time 470 and API front end 490 machines. The real time machines 470 can notify a synchronization client 480 when there has been an update in a user's account. The synchronization client 480 can then connect to API front end machine 490 to obtain the actual change/content. Alternatively, in some instances, the synchronization clients 480 can also obtain the changes/content/updates from the real time machines 470 simultaneous with the notification, or after being notified.

Figure 5:
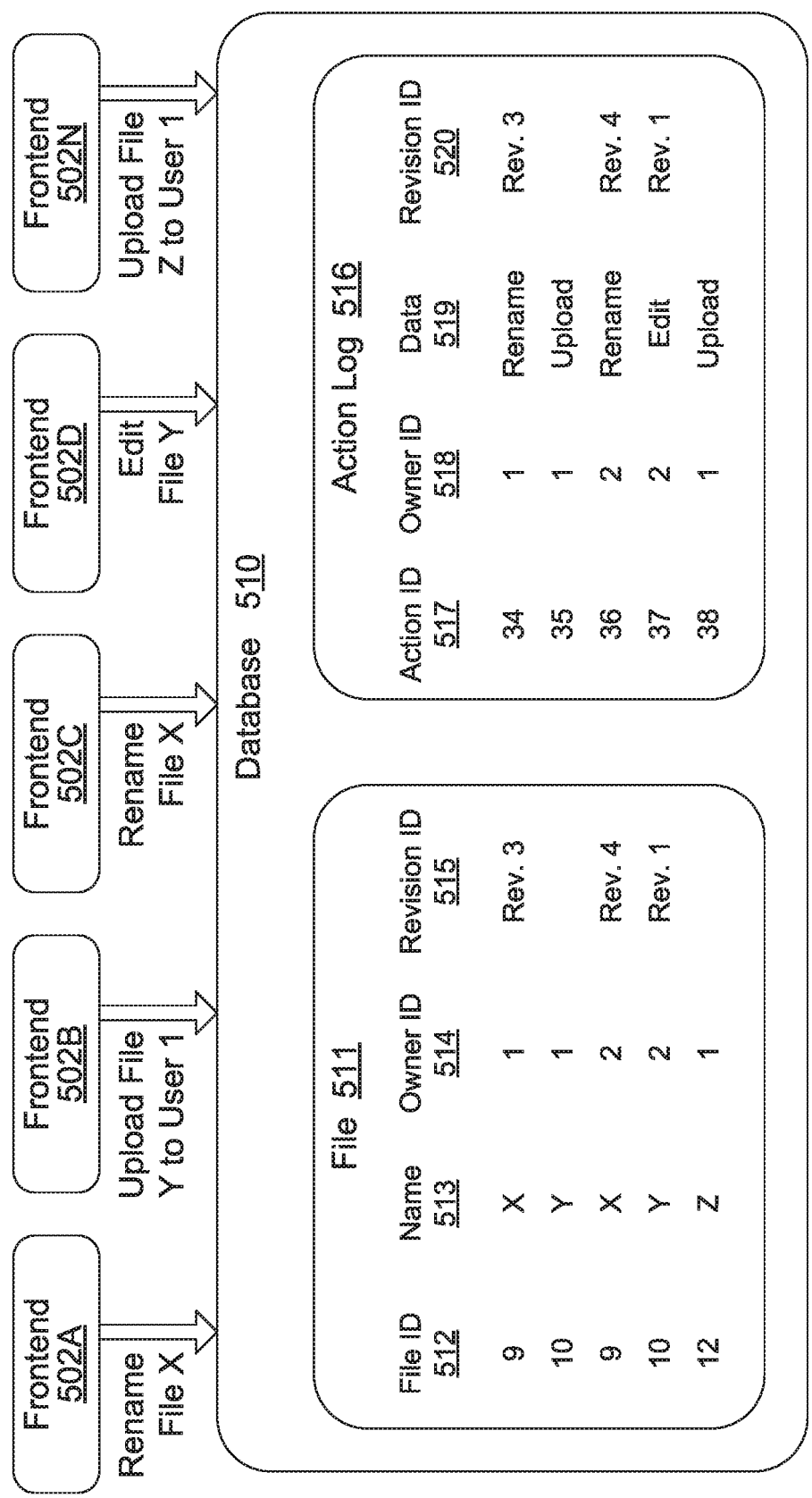
FIG. 5 depicts an example system block diagram showing action log entries recorded from actions/interactions on or with files/content stored in a database of a cloud-based environment.

FIG. 5 depicts an example system block diagram showing action log entries 516 recorded from actions/interactions on or with files/content 511 stored in a database 510 of a cloud-based environment.

The front ends 502A-N detect, identify, or receive the various actions or events on data or content performed by users or collaborators in a cloud-based environment. For example, events/actions can include by way of example but not limitation, file renames, file uploads/downloads, file edits, comments, etc. Based on the type of event, the front end 502 determines whether the action/event is to be created into a log entry to be stored in the action log 516. In creating a log entry, each action/event is recorded as a transaction with the file system change for asynchronous processing. In recording the transaction, the relevant file/folder row in the file 511 of the database 510 is inserted, updated, deleted, or otherwise modified according to the action. In one embodiment, the row is inserted in to the action log table 516 simultaneously with the write to the file 511 and also with the performance of action itself. Note that each entry includes an owner ID 514 in the file 511 and in the action log 516 to represent the owner of the item upon which an action occurred.

In one embodiment, action log entries are created in the same database 510 as the file table 511 such that file/content rollback can be performed if the file/data/content change results in an error or failure. As such, the action log entry creation in the action log table 516 can be created, in part, to meet durability (e.g., longevity) requirements of a given event/transaction (e.g., write events, or other edit events typically have higher durability requirements than a comment event, or a share event, etc.).

Action log entries can be created for select types of events or all events. For example, events/transactions such as file renames, file uploads may have higher durability requirements than a comment event, or a share event, in a sense that the changes from a file rename/file upload need to be maintained and updated at various respective clients for the relevant collaborators and the implication for missing a file rename or file upload is potentially more severe than missing a comment event or a share event, etc.

In general, action log entries are generally created for actions/events with higher durability requirements. Such a determination can be made by the front ends 502 as to whether a given event type is to be writing into the action log table 516. Action log entries may also be created for all events with durability requirements carried out downstream at event queues stored in the second database (e.g., the database 460 of FIG. 4B). Table 516 shows the action log entries created from the events stored in the file table 511.

The action log entries can be identified by the action ID 517. In addition, each action log entry can be associated with a user (e.g., owner) identifier 518, a data entry 519, and/or a revision identifier 520. The user identifier 518 can identify a user who is to a recipient as a result of an event (e.g., upload file to User 1). The owner identifier 518 represents the owner of the item upon which an action (e.g., represented by action ID 517) occurred and in general, each work item has no more than one owner. The data field 519 can identify the type of action/event (e.g., rename, upload, edit, comment, share, send, download, etc.).

The revision identifier 520 can indicate the version of any change made to a given file (e.g., edit, rename, upload, etc.). In one embodiment, the revision identifier 520 is derived from version tracking mechanisms (e.g., via revision ID 515) inherent to the database 510. The revision identifier 520 can be used by remote clients to resolve conflicts in view of potentially conflicting events/transactions. For example, if a file is re-named twice and both events are synchronized/updated at a remote client, the client can use the rename event associated with the latest revision ID to make the necessary updates. This can ensure that the client is updated with the most current change regardless of when the events are read from the queue. Thus, even if the two rename events are writing to the queue for the client out of order, the client can still make the 'correct' update using the revision ID in case of conflicting changes.

Figure 6:
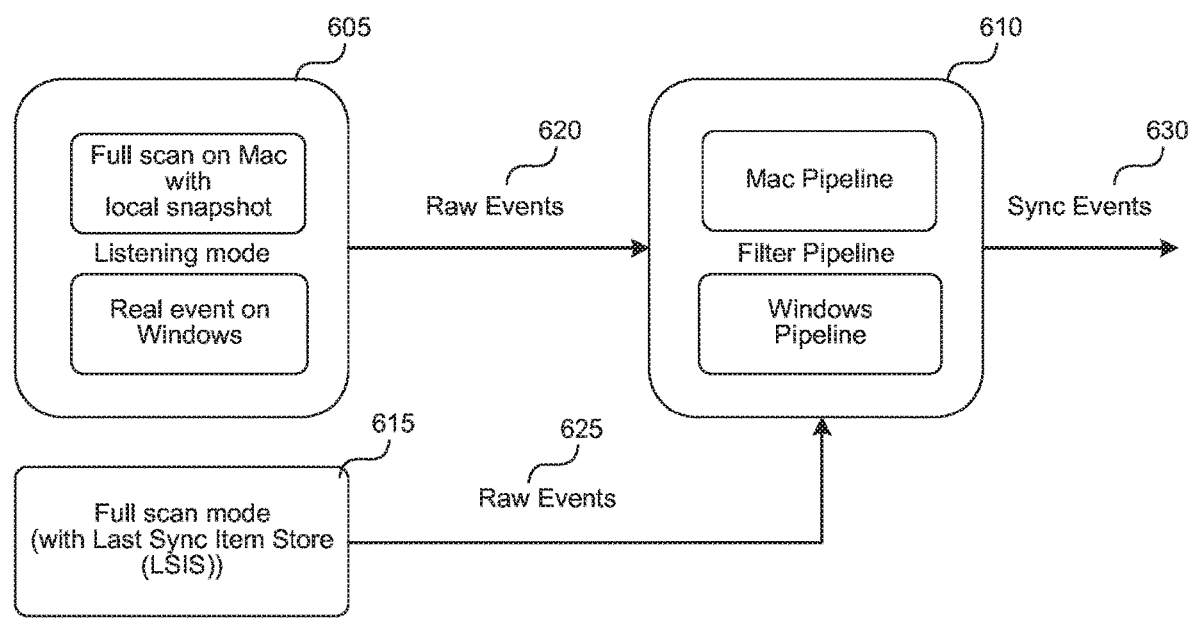
FIG. 6 depicts a diagram illustrating local event monitoring in a first embodiment of the synchronization client of the cloud-based platform.

FIG. 6 depicts a diagram illustrating local event monitoring in some embodiments of the sync client of the cloud-based platform. As illustrated, the local event monitoring can operate in two modes, the listening mode 605 and the full scan mode 615. In the listening mode 605, the local event monitor receives events for items that are changing on the filesystem. On Mac OS-based clients, the OS can notify the sync client about directories that have changes. The sync client can then re-scan the directories to manufacture the events. On Windows OS-based clients, for example, the OS gives the sync clients the actual or real events except for moves and renames which are reported as delete+create events.

In the full scan mode 615, the local event monitor can compare the state of the filesystem with the Last Sync Item Store (LSIS) to manufacture or generate events for the changes that have occurred. The raw events 620/625 that are generated by the listener or the full scanner can be fed into a filter pipeline that normalizes the stream of raw events and produces sync events that the rest of the system can apply on the opposite filesystem in some embodiments. Because of the difference in the way the events are generated on each platform (for example the delete+create for moves), the filter pipeline configuration can vary based on the platform (e.g., Windows, Mac).

With the above described state, there are in effect two implementations of full scan and both operate with different sets of data. Each implementation can manufacture a different set of events, bug duplication, code duplication, etc. The events can also be different across different platforms. This can have cascading effects—e.g. the filter pipeline may be different. The event generator on a Mac platform has the filesystem information but on Windows platform it does not and so it may be necessary to have one filter to collect the filesystem information and add it to the raw events (which can introduce race condition because the item may have changed). Accordingly, some embodiments refactor the Local Event Monitor so that only one full scanner is implemented (i.e., the listening mode 605 or the full scan mode 615). Other embodiments can use the full scan mode 615 for all platforms. For example, in some embodiments, a watchdog (used by the listening mode) can be used and the full scanner can be removed. Alternately, the watchdog can be removed and the full scanner can be implemented.

Figure 7:
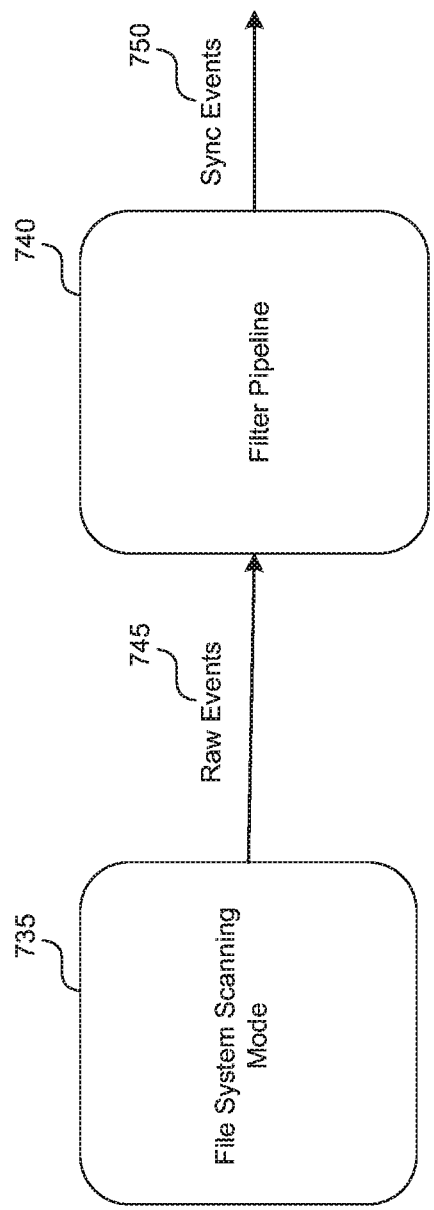
FIG. 7 depicts a diagram illustrating local event monitoring in a second embodiment of the synchronization client of the cloud-based platform.

FIG. 7 depicts a diagram illustrating local event monitoring in some embodiments of the sync client of the cloud-based platform. The event monitoring as described with respect to FIG. 6 is refactored to maximize code maintainability through encapsulation and reuse of common methods and data structures across the local file system and the remote file system at the cloud-based platform server. The listen and full scan modes described with respect to FIG. 6 are collapsed into one full scan mode implemented by the file system scanning mode 735, thereby removing duplication of full scan logic between the sync client and the watchdog.

On the local file system, the file system scanning mode 735, as part of the event monitoring process, turns file system notifications about files or folders that have changed from file system observers into raw events 745 by determining item changes and ordering the item changes. On the cloud-based platform, the file system scanning mode 735 listens to the ALF stream, which can directly provide a list of files or folders that have changed or notifications about the files or folders that have changed, determines item changes and orders the item changes to produce raw events 745 that are then processed by the filter pipeline 740 into sync events 750 suitable for execution on the opposing file system.

FIG. 8A depicts a block diagram illustrating example components of a device 800 (e.g., devices 102 in FIG. 1) having a sync client 810 of the cloud-based platform for sync event building using a single mode and/or sync event collapsing.

The device 800 can include, for example, a bus 802, and a memory 804 among other components. The memory 804 can include, among others, a sync client 810 and a communication module 806. The communication module 806 facilitates communication among the device 800, the host server 100, and other components discussed herein (e.g., the ALF system 490) using any of the communication protocols that are supported. The memory 804 may also include other device modules (not shown in FIG. 8A for simplicity) such as a GPS module for determining and providing location information, text input module for accepting and processing inputs provided using different input mechanisms of the mobile device, and the like for handling various functions of the device 800. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the device 800 and each illustrated component.

As used herein, a "module," "a manager," an "interface," "observer," "builder," "scanner," "pipeline," "filter," "detector," "generator," "re-orderer," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, observer, builder, scanner, pipeline, filter, detector, generator, re-orderer or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The bus 802 is a subsystem for transferring data between the components of the mobile device 800. For example, the bus 802 facilitates the transfer of data between the memory 804 and other components of the device 800 such as the processor and/or the input/output components that utilize the data.

Figure 8B:
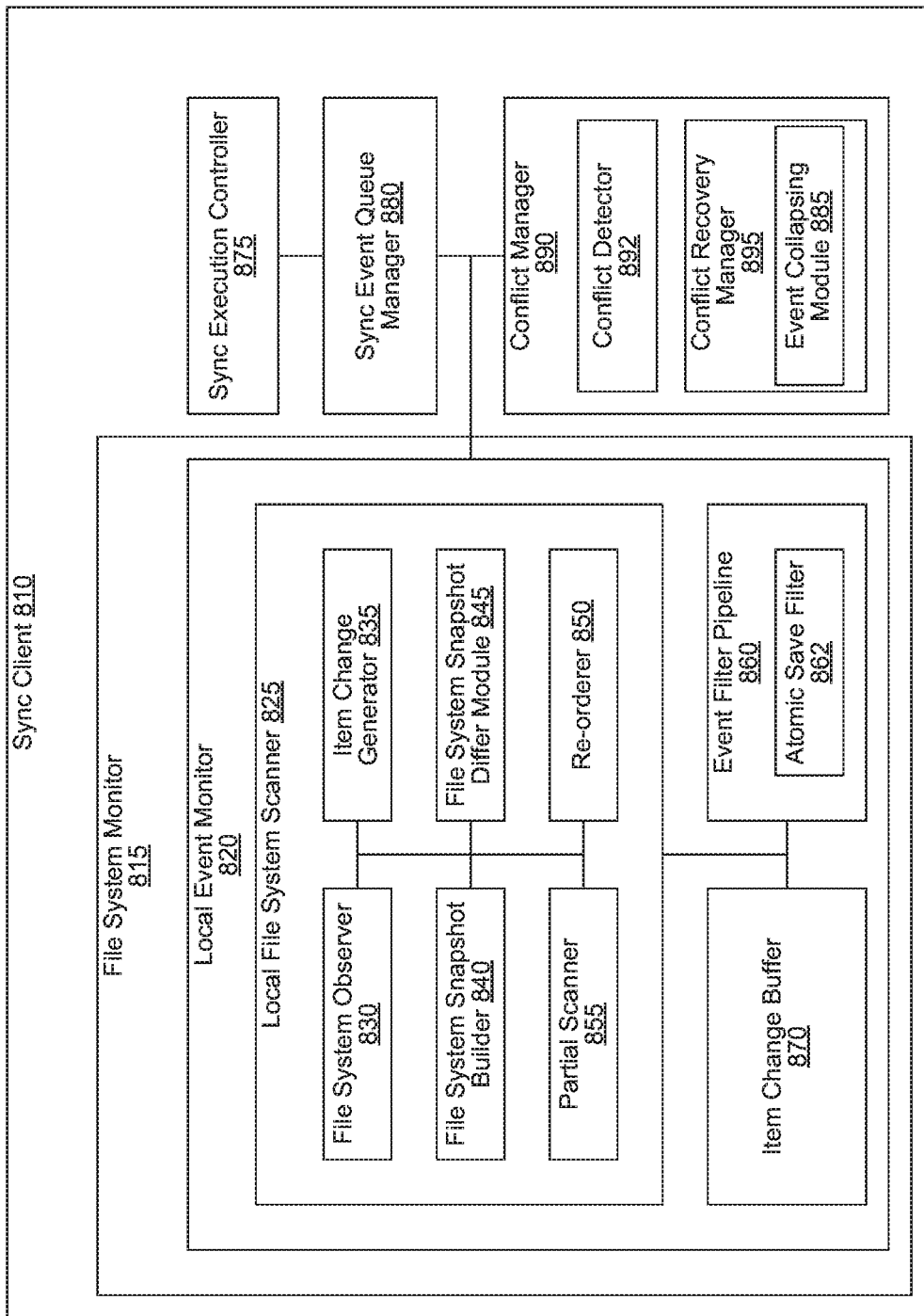
FIG. 8B depicts a block diagram illustrating example components of the synchronization client of FIG. 8A.

Example components of the sync client 810 are illustrated in the block diagram of FIG. 8B. In some embodiments, the sync client 810 can include a local event monitor 820 (or raw event processor) having a local file system scanner 825 including a partial scanner 855, a file system observer 830, an item change generator 835, a file system snapshot builder 840, a file system snapshot differ module 845 and a re-orderer 850, among others. The local event monitor 820 can also include an event filter pipeline 860 having an atomic save filter 862 and an item change buffer 870. The sync client can also include a sync execution controller 875, a sync event queue manager 880 and a conflict manager 890 having a conflict detector 892 and a conflict recovery manager 895 having an event collapsing module 885. Other embodiments may include more or less components.

In one embodiment of the present disclosure, during normal operations, the sync client 780 can operate in a single mode. The file system observers 830 can generate file system notifications when a file or folder changes on the local file system. The file system notifications can include information about the changed file or folder (i.e., dirty file or folder). Generally, the file system observer 830 provides notifications about dirty folders. The local event monitor 825 then triggers the partial scanner 855 to perform a partial scan of the local file system to obtain the full set of dirty items.

In some embodiments, the partial scanner 855 performs partial scanning of the affected or dirty folder by leverage the item change generator 835. The item change generator 835 generates a consistent snapshot (e.g., via the file system snapshot builder 840) and compares the consistent snapshot with a reference snapshot to generate differences between the two snapshots (e.g., file system snapshot differ 845). In other words, the item change generator 835 can determine item changes based on a consistent snapshot of a folder whose children have changed and a reference snapshot of the folder in response to the file system notifications. The partial scanner 855 then updates the reference snapshot by applying the new (consistent) snapshot on top. In some embodiments, a snapshot can be built or generated by walking or traversing the directory (or dirty folder tree) and recording all entries. If there are no dirty folders added to the queue for a settle time (e.g., 100 ms), the snapshot is called consistent. If there is a new file system notification, a snapshot is built for that notification, and a new snapshot is built by merging the snapshot for the dirty folder on top of the original snapshot. In some embodiments, the differences between a reference snapshot and the current snapshot are obtained by the file system snapshot differ 845. The reference snapshot can pertain to the last known state of the dirty folder. It should be noted that for the first run, the reference snapshot is built from the persisted LSIS. Via the partial scanning process, the differences between the reference and current snapshots can be determined by generating a list of all item ids that are in the reference snapshot and in the domain of the current snapshot. The process loops through all elements in the current snapshot and obtains item changes for everything that has a different item state in the reference snapshot. All the observed items are then removed from the all item id list. The process then yields item changes with delete set to true for all items remaining in the all item id list. The process then updates the reference snapshot by applying the new snapshot on top of it.

In some embodiments, the re-orderer 850 can detect inter-item event dependencies and re-order the changes as necessary before feeding the item changes to the filter pipeline 860. The re-orderer 850 can reorder items by checking each change against a snapshot of the monitored filesystem to see if the new state brought about by the change is consistent with the rest of the filesystem. If it is, the change is passed on to the event filter pipeline 860 and the snapshot is updated to reflect the change. Otherwise, the change is buffered (e.g., in the item change buffer 870) until another item change alters the snapshot in such a way as to make the buffered change consistent. If an item change remains buffered for longer than a filesystem specific timeout, which can be configurable in some embodiments, then it is assumed that either a change has been missed by the filesystem scanner or the filesystem scanner has returned corrupt changes. In such instances, a notification can be generated for error handling, the change can be dropped, or other process can be initiated to resolve the inconsistency. In one example embodiment, the re-orderer 850 can perform a number of checks to determine if the change is consistent with the existing snapshot.

For example, if the change is for a deleted folder, the re-orderer 850 can check the snapshot to see that the folder does not contain any children. If the change is for a non-deleted item, the re-orderer 850 can check the snapshot to see that the parent folder of the item exists and that no other item with the same name exists in the parent folder. If the change represents a move, the re-orderer 850 can check the snapshot to see that the item is not an ancestor of its new parent. In some embodiments, the re-orderer 850 can also detect and handle circular renames by manufacturing an item change for one of the items that moves the item to a temporary location.

Raw events are produced by the local file system scanner by ordering the item changes and producing a set of executable actions like create, delete, etc. The raw events are processed by the event filter pipeline 860 into sync events that can be executed directly on the opposite file system (i.e., the cloud-based platform file system). In some embodiments, processing the raw events into sync events include translating the file system identifiers of items to logical identifiers so that the events can be executed directly on the opposite file system. An atomic save filter 862 can maintain the mapping between the logical identifiers and the underlying file system identifiers. The mapping and translation of file system identifiers into logical identifiers is needed as the raw events refer to the file system identifier, rather than the logical identifier and on the local file system, the file system identifier of an item can change while the item remains logically the same. The sync events describe executable actions like create, delete, etc., and the sync client is committed to at least attempting to execute the sync events as the sync events are produced in an order that can be consistently applied to the opposite file system.

Some embodiments of the sync client 810 include a sync event queue manager 880 that places sync events on a sync event queue for serialized execution. The sync execution controller 875 gets the next event to execute from the sync event queue. The execution controller 875 can have a list based or priority based implementation. For example, in the list based implementation, the next event candidate is checked against the items that are in progress and if the item already has an in progress sync event, the next event candidate is skipped. In the priority based implementation, unprocessed events are managed in a priority queue of sync event containers. A sync event container is a set of all unprocessed sync events for a given item, weighted by the lowest weight sync event in the container. When one sync event from this sync event container is executed, then all sync events for that item are no longer in the priority queue and so the remaining sync events in the sync event container will not be executed on subsequent get_next_sync_event( ) calls. When the in-process sync event is completed, it is removed from the sync event container which is returned back into the priority queue if not empty.

Some embodiments of the sync client 810 include a conflict manager 890. The conflict manager, via the conflict detector 892, can identify when a sync has failed or when a conflict has occurred (e.g., a file or work item/folder has been changed at both the server sync folder and the local sync folder) which caused the sync to fail. A sync event can fail for various reasons which may be conflict related or unrelated. Example failure reasons that are related to conflict include, but are not limited to: item not found, item name in use, item name not valid, item name too long, item locked, version mismatch, or the like. Other failure reasons can include, for example, communication failure (e.g., network goes down), authentication failure (e.g., auth token expired), quota failure, or the like. Some of these sync failures are local to a particular sync event (e.g., item not found is local to a sync event relating to the item) while others are global (e.g., communication failure can impact all sync events). The conflict detector 892 can in general detect sync failures that are conflict related or unrelated.

The conflict manager 890 includes a conflict recovery manager 895 to determine how to resolve the conflict, resolve the conflict using the determined strategy and try to sync again when one or more retry conditions are met. The conflict recovery manager 895 can include several conflict resolvers to resolve various conflict cases. The conflict recovery manager 895 selects a conflict resolver that is mapped to the event type, file system and/or failure reason triple to resolve a conflict related to a sync event. A conflict resolver resolves the conflict by calling a rules engine to determine what action to take to resolve the conflict. When the specified action or actions is taken, the file system is restored back to its consistent state.

In some embodiments, one example conflict resolver includes an event collapsing module 885. The event collapsing module 885 can collapse a failed event into a later event to successfully execute the original event. When the conflict detector 892 detects name conflict as the failure reason for a sync event, the event collapsing module 885 can use a later rename event to collapse into the original event before retrying the failed event. Similarly, when the conflict detector 892 detects as the item not found on the source filesystem during execution as a reason for failure of a sync event, the event collapsing module 885 collapses a later delete event into the failed event before retrying the failed event. By way of another example, when the conflict detector 892 detects an item change when deleting the item on the opposite file system as a reason for failure of a sync event, the event collapsing module 885 collapses a later create event into the failed event before retrying the failed event. After collapsing a failed event into a later or subsequent event, the resulting event is placed in the sync event queue 980 for execution.

Figure 9:
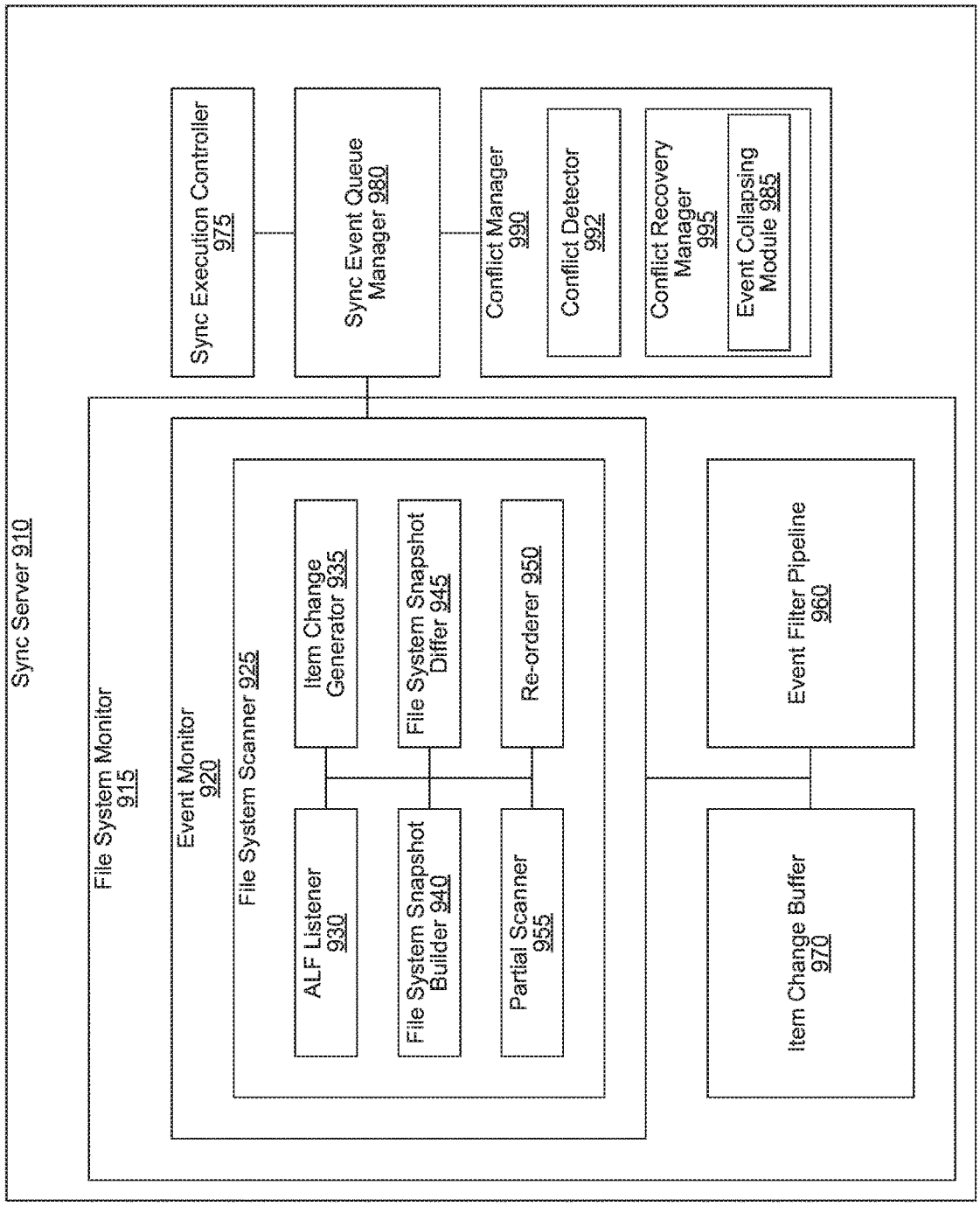
FIG. 9 depicts a block diagram illustrating example components of a synchronization server of a cloud-based platform for synchronization event building using a single mode and/or synchronization event collapsing.

FIG. 9 depicts example components of a sync server 910 of a cloud-based platform. The sync server 910, in some embodiments, includes many of the same components as the sync client 810 described in FIG. 8B for sync event building and event collapsing. For example, the sync server 910 can include a file system monitor 915 having an event monitor 920 and an event filter pipeline 960. The event monitor 920 can include a file system scanner 925 having an ALF listener 930, an item generator 935, a file system snapshot builder 940, a file system snapshot differ 945, a partial scanner 955 and a re-orderer 950. The sync server 910 can also include a sync execution controller 975, a sync event queue manager 980 and a conflict manager 990 having a conflict detector 992 and a conflict recovery manager 995. The conflict recovery manager 995 can include an event collapsing module 985.

The ALF listener 930, in some embodiments, can detect ALF events. The ALF events can include information about a new item state and minimal information about the type of change that occurred on an item. In some embodiments, the ALF listener 930, by listening to ALF stream, can directly obtain items that have been changed and their new states. Alternatively, the ALF listener 930 can obtain notifications that specific folders are recursively dirty. The partial scanner 955 can then be invoked to scan the affected folders to obtain the items that have been changed. The partial scanner 955 employs a method substantially similar to the method employed by the partial scanner 855 to generate differences between a reference snapshot and a current snapshot to obtain item changes and update the reference snapshot by applying the new snapshot on top of it. In some embodiments, the file system snapshot builder 940 of the sync server 910 can use an application programming interface (API) call to obtain an account tree and using the account tree data obtained as a response to generate a consistent snapshot of a folder that has been changed (or is dirty).

In some embodiments, the file system identifier of an item on the cloud-based platform is suitable for use as a logical identifier for the item. This enables the event filter pipeline 960 to generate sync events from raw events without requiring a translation between the logical identifiers and the file system identifiers.

Figure 10A:
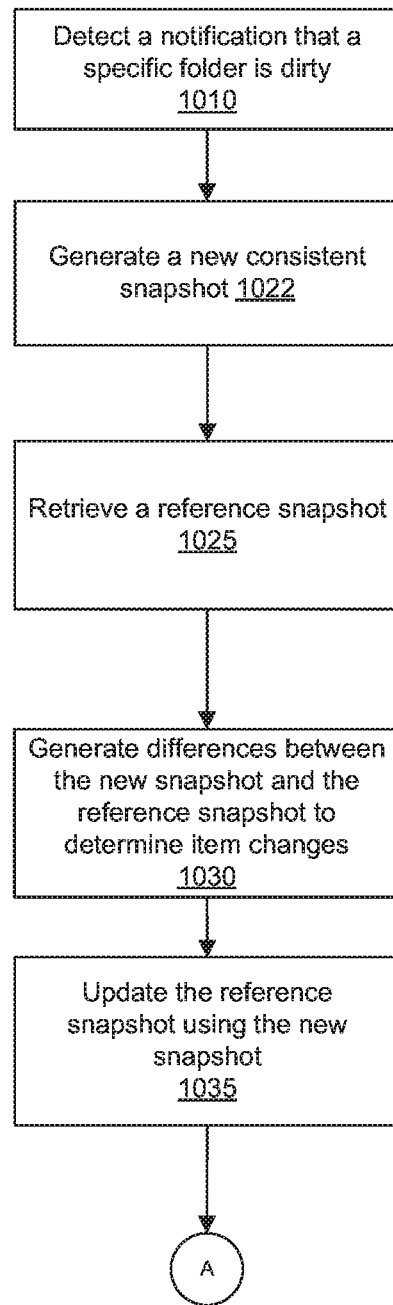
FIG. 10A depicts a logic flow diagram illustrating an example method of generating item changes for synchronization event building

FIG. 10A depicts a logic flow diagram illustrating an example method of generating item changes for sync event building. The example method includes a sync component (e.g., sync client, sync server) detecting a notification that a specific folder is dirty (i.e., the folder has been changed in the workspace) at block 1010. In some embodiments, the sync server receives the notification from the ALF stream. In some embodiments, instead of the notification, the sync server can receive a set of dirty items and their new states representing a current snapshot. In some embodiments, the sync client can receive the notification from a file system observer. Upon receiving the notification, the sync component can perform a partial scan of the affected folder. Performing a partial scan can include generating a new consistent snapshot of the affected folder at block 1022. The new consistent snapshot of the affected folder can include a list of dirty items and their new states. In some embodiments, the sync server can generate a consistent snapshot using an API call such as a transaction GAT request which returns a set of dirty items. In some embodiments, the sync client can generate a consistent snapshot by traversing through the dirty folder and recording all the entries to obtain a set of dirty items and their new states.

At block 1025, the sync component retrieves a reference snapshot of the dirty folder. The reference snapshot inside a file system scanner stores the last known states of the dirty items. At block 1030, the sync component generates differences between the reference snapshot and the new snapshot to determine item changes. In some embodiments, generating the differences between the two snapshots includes generating a list of all item identifiers that are in the reference snapshot ("all item ID list"). The sync component then processes each item identifier in the new snapshot to determine item changes for all item identifiers in the new snap shot that have a different item state in the reference snapshot. All the item identifiers that have been observed or evaluated are then removed from the all item ID list. The sync client further determines item changes with delete set to true for all item identifiers remaining in the all item ID list. At block 1035, the sync client updates the reference snapshot using the new snapshot. In some embodiments, the reference snapshot is updated using not only the changes detected from the partial scan but also from any changes made by sync executors on the monitored file system.

Figure 10B:
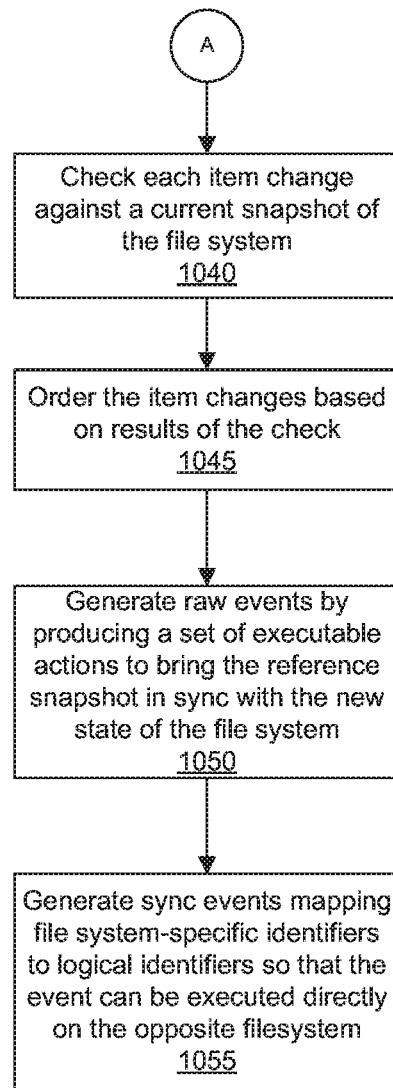
FIG. 10B depicts a logic flow diagram illustrating item change ordering and raw event generation for synchronization event building

FIG. 10B depicts a logic flow diagram illustrating item change ordering and raw event generation for sync event building. Once the item changes have been determined and the reference snapshot is updated, the sync component can check each item change against a current snapshot of the file system to determine an order in which item changes should be applied at block 1040. For example, if the change is for a deleted folder, the snapshot can be checked to see that the folder does not contain any children. If the change is for a non-deleted item, the snapshot can be checked to see that the parent folder of the item exists and that no other item with the same name exists in the parent folder. If the change represents a move, the snapshot can be checked to see that the item is not an ancestor of its new parent. Like the filesystem snapshot described in FIG. 10A, the filesystem snapshot for ordering item changes can also include changes made by the sync executor and the file system scanner. At block 1045, based on the results of the check against the current snapshot of the filesystem, the sync component orders the item changes so that the item changes are consistent with the existing snapshot. In some embodiments, item changes that are not consistent with the existing snapshot are buffered until another item change alters the snapshot of the filesystem. At block 1050, the sync component generates raw events by using the ordered item changes to produce a set of executable actions. At block 1055, the sync component generates sync events by mapping file system identifiers to logical identifiers to enable syncing between the local file system and the remote file system.

Some embodiments of the present disclosure include a method of building synchronization events by a synchronization component associated with a cloud-based platform. The method can obtain a set of items that have been changed and new states of the set of items and retrieve last known states of the set of items. The last known states of the set of items are stored in a reference snapshot inside a filesystem scanner. The method can generate differences between the new states and the last known states of the set of items as item changes and utilize information provided by the item changes to translate the item changes into synchronization events.

The synchronization component can receive a notification of a change in a folder (e.g., the file system observer 830) and in response scan the folder to obtain the set of items that have been changed (e.g., partial scanner 855, item change generator 835). In some implementations, event dependencies between the item changes can be detected and the item changes can be ordered based on the detected event dependencies to allow the new state brought about by applying each item change is consistent with a filesystem (e.g., re-orderer 850). In some implementations, the synchronization component (e.g., re-orderer 850) can check each item change against a snapshot of a filesystem monitored by the synchronization component to determine if the new state brought about by the item change is consistent with the filesystem. If the new state brought about by the item change is not consistent with the filesystem, the synchronization component (e.g., item change buffer 870) can buffer the item change until another item change alters the snapshot of the filesystem. Similarly, if the new state brought about by the item change is consistent with the filesystem, the synchronization component can provide the item change to a filter pipeline (e.g., filter pipeline 860) for generating the synchronization events. In some implementations, the synchronization events include actions arranged in a predetermined order for execution on an opposing file system and the predetermined order allows the synchronization events to be executed without generating any inconsistencies. The synchronization component can be one of a synchronization client on a device or a synchronization server remote from the device and each can have an associated filesystem.

Some embodiments of the present disclosure includes a method of generating synchronization events associated with a synchronization component of a cloud-based platform. The method includes detecting that a folder on a filesystem has been changed, generating a new snapshot of the filesystem that is consistent, retrieving a reference snapshot of the filesystem, generating item changes by differencing the new snapshot from the reference snapshot and using the item changes to generate the synchronization events for execution on an opposing file system. The method can also include updating the reference snapshot using the new snapshot. In some implementations, the method includes checking each item change against a current snapshot of the filesystem to determine an order for executing the item changes and generating raw events in the determined order as executable actions to be applied to the opposing filesystem without generating inconsistencies. In some implementations, the method includes processing the raw events to generate the synchronization events for execution. Processing the raw events can include translating file system identifiers of items associated with the item changes to logical identifiers. In some implementations, differencing the new snapshot from the reference snapshot can further comprise generating a list of all item identifiers that are in the reference snapshot, processing each item in the new snapshot to obtain item changes for items that have different item states in the reference snapshot, removing all items involved in the processing from the list and obtaining item changes with delete set to true for all items remaining in the list.

Figure 11:
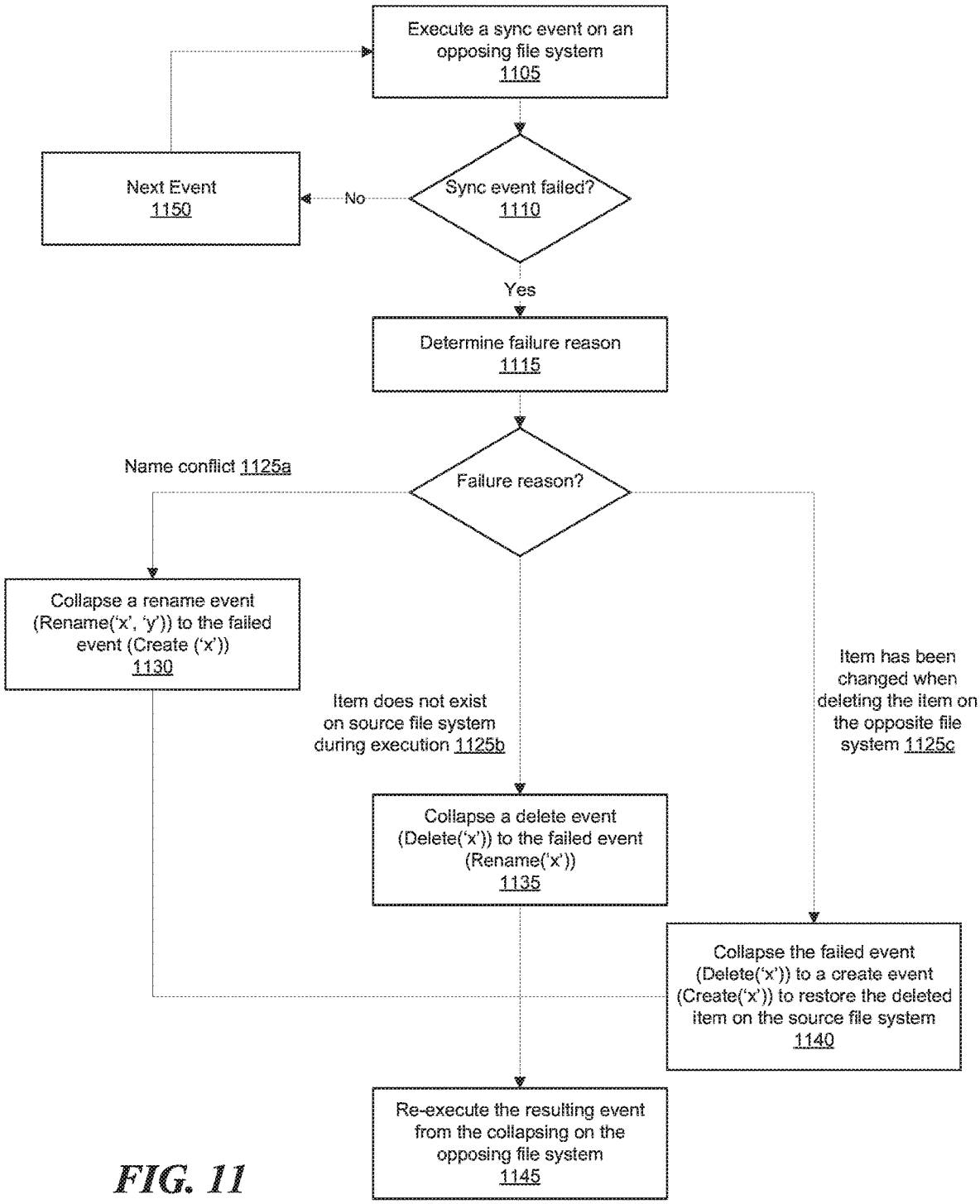
FIG. 11 depicts a logic flow diagram illustrating an example method of collapsing a failed event into a subsequent event to handle synchronization event failures.

FIG. 11 depicts a logic flow diagram illustrating an example method of collapsing a failed event into a subsequent event to handle sync event failures. The method starts at block 1105, when the sync component (e.g., a sync client or a sync server) attempts to execute a sync event on an opposite file system. At decision block 1110, if the sync event fails, the sync component can detect the failure event and determine a failure reason at block 1115. If the sync event is a success, the next sync event 1150 in the sync event queue is executed. In some embodiments, the failure reason can be a name conflict 1125a. In the event of a name conflict, the sync component can wait for a subsequent rename event and collapse the rename event into the failed event at block 1130. Collapsing the failed event into the rename event creates a new or resulting event that can then be re-executed by the sync component on the opposite file system at block 1145. In some embodiments, the failure reason can be that the item does not exist on source file system during execution 1125b. In this scenario, the sync component can wait for a subsequent delete event and collapse the delete event into the failed event at block 1135 and re-execute the resulting event at the opposing file system at block 1145. In some other embodiments, the failure reason can be that the item has been changed when deleting the item on the opposite file system 1125c. In this scenario, the sync component can collapse the failed event into a subsequent create event to restore the deleted item on the source file system and re-execute the resulting event on the opposing file system at block 1145.

Some embodiments of the present disclosure include a method of handling failed synchronization events by a synchronization component of a cloud-based platform. The method includes detecting a failed synchronization event associated with a synchronization item, identifying a subsequent synchronization event associated with the synchronization item to collapse with the failed synchronization event and re-executing the collapsed synchronization event on an opposing file system. In some implementations, the method can include determining a failure reason associated with the failed synchronization event and identifying the subsequent synchronization event based on the failure reason. In some implementations, when the failure reason includes name conflict, the subsequent synchronization event includes a rename event. Similarly, when the failure reason includes missing synchronization item on a source filesystem, the subsequent synchronization event includes a delete event. In some implementations, when the failure reason includes change in the synchronization item when deleting the synchronization item on the opposing file system, the subsequent synchronization event includes a create event. In some implementations, collapsing the subsequent synchronization event with the failed synchronization event can result in a single operation or no operation. The single operation can include a create operation, a rename operation, a move operation or a delete operation.

Figure 12:
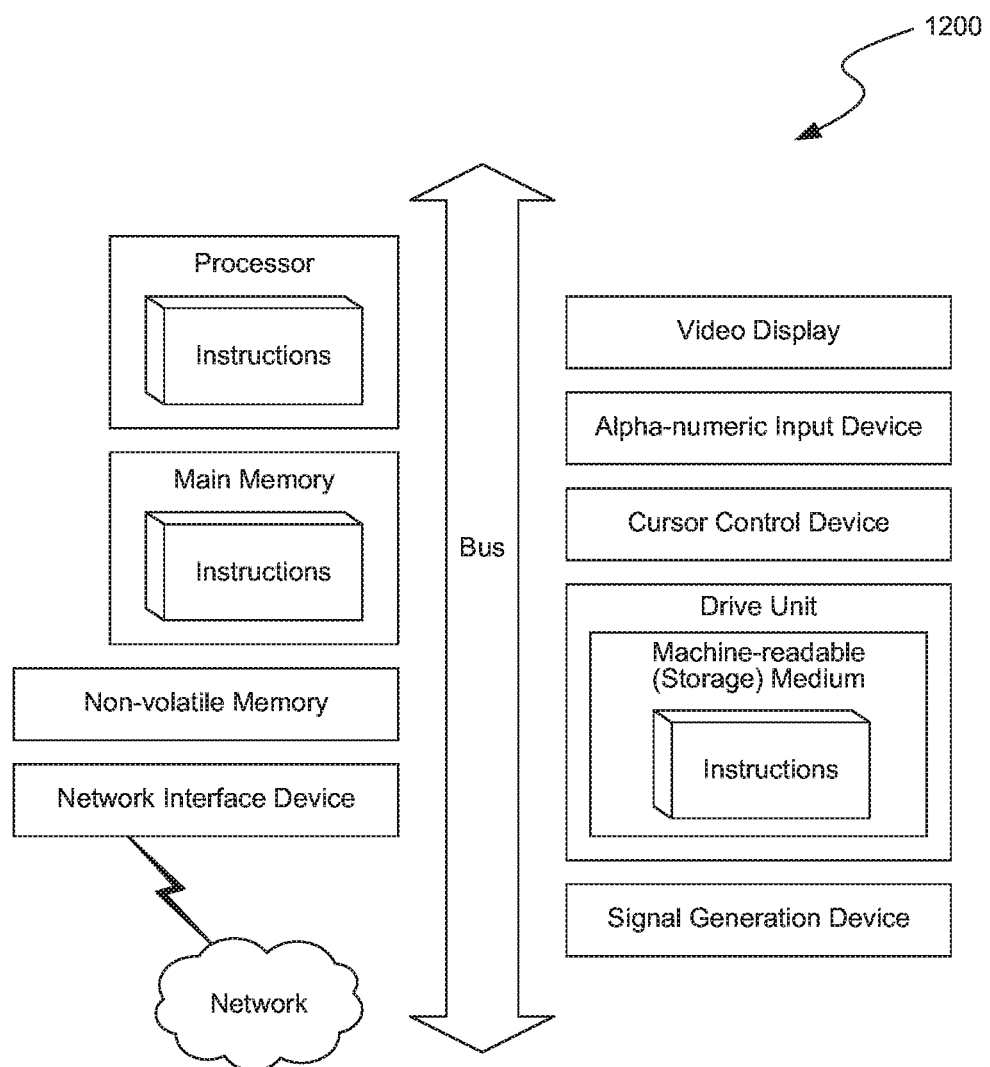
FIG. 12 depicts a diagrammatic representation of a machine in the example form of a computer system within which a set of instructions, for causing the machine to perform any one or more of the methodologies discussed herein, can be executed.

FIG. 12 shows a diagrammatic representation 1200 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1200 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects can likewise be embodied as a means-plus-function claim, or in other forms, such as being embodied in a computer-readable medium. (Any claim intended to be treated under 35 U.S.C. § 112, ¶6 begins with the words "means for".) Accordingly, the applicant reserves the right to add additional claims after filing the application to pursue such additional claim forms for other aspects of the disclosure.

The invention claimed is:

1. A method for generating synchronization events associated with a synchronization component of a cloud-based platform, the method comprising:
  detecting, by a synchronization server of the cloud-based platform, that a folder on a filesystem has been changed;
  generating, by the synchronization server, a new snapshot of the filesystem;
  retrieving, by the synchronization server, a reference snapshot of the filesystem;
  generating, by the synchronization server, item changes based on differences between the new snapshot and the reference snapshot;
  generating, by the synchronization server, the synchronization events based on the generated item changes and a filter pipeline, wherein the filter pipeline normalizes the item changes based on a system upon which the item changes were made; and
  updating, by the synchronization server, the reference snapshot using the new snapshot.

2. The method of claim 1, further comprising checking, by the synchronization server, each item change against a current snapshot of the filesystem.

3. The method of claim 2, further comprising ordering, by the synchronization server, the item changes based on results of checking each item against the current snapshot of the filesystem.

4. The method of claim 3, further comprising generating, by the synchronization server, raw events in the determined order as executable actions.

5. The method of claim 4, further comprising processing, by the synchronization server, the raw events to generate the synchronization events for execution.

6. The method of claim 5, wherein processing the raw events includes translating file system identifiers of items associated with the item changes to logical identifiers.

7. The method of claim 1, wherein generating item changes based on differences between the new snapshot and the reference snapshot further comprises:
generating a list of all item identifiers that are in the reference snapshot;
processing each item in the new snapshot to obtain item changes for items that have different item states in the reference snapshot;
removing all items involved in the processing from the list; and
obtaining item changes with delete set to true for all items remaining in the list.

8. A system comprising:
a processor, and
a memory coupled with and readable by the processor and storing therein a set of instructions which, when executed by the processor, causes the processor to generate synchronization events by:
detecting that a folder on a filesystem has been changed;
generating a new snapshot of the filesystem;
retrieving a reference snapshot of the filesystem;
generating item changes based on differences between the new snapshot and the reference snapshot;
generating the synchronization events based on the generated item changes and a filter pipeline, wherein the filter pipeline normalizes the item changes based on a system upon which the item changes were made; and
updating the reference snapshot using the new snapshot.

9. The system of claim 8, wherein the instructions further cause the processor to check each item change against a current snapshot of the filesystem.

10. The system of claim 9, wherein the instructions further cause the processor to order the item changes based on results of checking each item against the current snapshot of the filesystem.

11. The system of claim 10, wherein the instructions further cause the processor to generate raw events in the determined order as executable actions.

12. The system of claim 11, wherein the instructions further cause the processor to process the raw events to generate the synchronization events for execution.

13. The system of claim 12, wherein processing the raw events includes translating file system identifiers of items associated with the item changes to logical identifiers.

14. The system of claim 8, wherein generating item changes based on differences between the new snapshot and the reference snapshot further comprises:
generating a list of all item identifiers that are in the reference snapshot;
processing each item in the new snapshot to obtain item changes for items that have different item states in the reference snapshot;
removing all items involved in the processing from the list; and
obtaining item changes with delete set to true for all items remaining in the list.

15. A non-transitory, computer-readable medium comprising a set of instructions stored therein which, when executed by a processor, causes the processor to generate synchronization events by:
detecting that a folder on a filesystem has been changed;
generating a new snapshot of the filesystem;
retrieving a reference snapshot of the filesystem;
generating item changes based on differences between the new snapshot and the reference snapshot;
generating the synchronization events based on the generated item changes and a filter pipeline, wherein the filter pipeline normalizes the item changes based on a system upon which the item changes were made; and
updating the reference snapshot using the new snapshot.

16. The non-transitory, computer-readable medium of claim 15, wherein the instructions further cause the processor to:
check each item change against a current snapshot of the filesystem; and
generate raw events in the determined order as executable actions.

17. The non-transitory, computer-readable medium of claim 16, wherein the instructions further cause the processor to.

18. The non-transitory, computer-readable medium of claim 17, wherein the instructions further cause the processor to process the raw events to generate the synchronization events for execution.

19. The non-transitory, computer-readable medium of claim 18, wherein processing the raw events includes translating file system identifiers of items associated with the item changes to logical identifiers.

20. The non-transitory, computer-readable medium of claim 15, wherein generating item changes based on differences between the new snapshot and the reference snapshot further comprises:
generating a list of all item identifiers that are in the reference snapshot;
processing each item in the new snapshot to obtain item changes for items that have different item states in the reference snapshot;
removing all items involved in the processing from the list; and
obtaining item changes with delete set to true for all items remaining in the list.

* * * * *